US012738245B2

(12) United States Patent
Takeuchi et al.

(10) Patent No.: US 12,738,245 B2
(45) Date of Patent: Sep. 15, 2026

(54) SCANNING SIGNAL LINE DRIVE CIRCUIT AND DISPLAY DEVICE PROVIDED WITH SAME

(71) Applicant: Sharp Display Technology Corporation, Kameyama City (JP)

(72) Inventors: Yohei Takeuchi, Kameyama City (JP); Jun Nishimura, Kameyama City (JP); Masaki Maeda, Kameyama City (JP); Yoshiharu Hirata, Kameyama City (JP); Yoshihito Hara, Kameyama City (JP); Tohru Daitoh, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/199,586

(22) Filed: May 6, 2025

(65) Prior Publication Data

US 2025/0372057 A1 Dec. 4, 2025

(30) Foreign Application Priority Data

May 30, 2024 (JP) ................................ 2024-088102

(51) Int. Cl.
*G09G 3/36* (2006.01)

(52) U.S. Cl.
CPC ... *G09G 3/3655* (2013.01); *G09G 2310/0286* (2013.01); *G09G 2330/04* (2013.01)

(58) Field of Classification Search
CPC .................................................... G09G 3/3655
USPC ......................................................... 345/208
See application file for complete search history.

(56) References Cited

U.S. PATENT DOCUMENTS

| | | | | |
|---|---|---|---|---|
| 10,199,001 | B2 * | 2/2019 | Enami .................. | G09G 3/3696 |
| 2005/0104836 | A1 * | 5/2005 | Lin ...................... | G09G 3/3677 345/98 |
| 2010/0201659 | A1 * | 8/2010 | Miyake ................ | H03K 17/162 345/205 |
| 2022/0189409 | A1 * | 6/2022 | Nishio ................. | G09G 3/3275 |

FOREIGN PATENT DOCUMENTS

| | | |
|---|---|---|
| JP | 2015-181083 A | 10/2015 |

* cited by examiner

*Primary Examiner* — Calvin C Ma
(74) *Attorney, Agent, or Firm* — ScienBiziP, P.C.

(57) ABSTRACT

A scanning signal line drive circuit as a GDM circuit is composed of a plurality of cascade-connected unit circuits and is operated by a multi-phase clock signal in which pulses partially overlap. The nth stage unit circuit includes: an internal node; a diode-connected set transistor connected to a set input terminal; a reset transistor including a drain terminal connected to the internal node, a source terminal connected to a reset state voltage terminal, and a gate terminal connected to the reset input terminal; and an output circuit including an output transistor connected to a clock input terminal and a capacitor, a scanning signal G(n−2), a scanning signal G(n+2), and a scanning signal G(n+1) being supplied to the set input terminal, the reset input terminal, and the reset state voltage terminal, respectively.

8 Claims, 15 Drawing Sheets

SCANNING SIGNAL LINE DRIVE CIRCUIT AND DISPLAY DEVICE PROVIDED WITH SAME

CROSS-REFERENCE TO RELATED APPLICATIONS

This application claims the benefit of priority to Japanese Patent Application Number 2024-088102 filed on May 30, 2024. The entire contents of the above-identified application are hereby incorporated by reference.

BACKGROUND

Technical Field

The following disclosure relates to a display device and more particularly relates to a scanning signal line drive circuit for driving scanning signal lines disposed on a display portion of the display device.

Typically, an active matrix display device has been known in which the active matrix display device is provided with a display portion including a plurality of data signal lines (also referred to as “data lines”), a plurality of scanning signal lines (also referred to as “gate lines”) intersecting the plurality of data signal lines, and a plurality of pixel forming sections arranged in a matrix shape along the plurality of data signal lines and the plurality of scanning signal lines. Such an active matrix display device includes a data signal line drive circuit (also referred to as a “data driver” or a “source driver”) for driving the plurality of data signal lines and a scanning signal line drive circuit (also referred to as a “gate driver”) for driving the plurality of scanning signal lines. The scanning signal line drive circuit applies each of a plurality of scanning signals to a corresponding one of the plurality of scanning signal lines so that each of the plurality of scanning signal lines is sequentially selected in each frame period, and the data signal line drive circuit applies each of a plurality of data signals representing an image signal to be displayed to a corresponding one of the plurality of data signal lines in association with such a sequential selection of the plurality of scanning signal lines. Accordingly, each of a plurality of pieces of pixel data constituting image data representing an image to be displayed is provided to a corresponding one of the plurality of pixel forming sections.

Incidentally, in an active matrix display device, typically, the scanning signal line drive circuit has been mounted as an integrated circuit (IC) chip on a peripheral portion of a substrate constituting a display panel including the display portion described above in many cases, but recently, the scanning signal line drive circuit is directly formed on the substrate in many cases. Such a scanning signal line drive circuit is referred to as a “monolithic gate driver”, “GDM circuit” or the like, and a display panel including such a scanning signal line drive circuit is referred to as a “gate driver monolithic panel” or a “GDM panel”. In the GDM panel, the scanning signal is input from the gate driver serving as the scanning signal line drive circuit formed in a frame region of the GDM panel toward a display portion serving as a display region. According to such a GDM panel, by using a thin film transistor (hereinafter, abbreviated as “TFT”) including a channel layer formed of, for example, an oxide semiconductor such as Indium Gallium Zinc Oxide (IGZO) or the like, the gate driver can be formed on glass in a small area resulting in achieving a narrowed frame.

SUMMARY

The above-described monolithic gate driver (GDM circuit) may be formed on the substrate constituting the display panel by using a thin film transistor (TFT). In a display panel such as a liquid crystal panel including such a GDM circuit, that is, a gate driver monolithic panel, characteristics of the TFT included in the GDM circuit are deteriorated due to voltage stress or the like. In particular, when the voltage of the GDM circuit is increased for high frequency drive, the voltage stress applied to the TFT is increased to cause deterioration of the characteristics of the TFT called hot carrier degradation, which may cause a display defect. In recent years, since the drive voltage tends to increase with an increase in the size of the display panel and an increase in the drive frequency, the possibility of occurrence of a display defect due to such hot carrier degradation of the TFT is increasing.

Therefore, in a display device including a gate driver monolithic panel having a high drive voltage, it is necessary to suppress occurrence of a display defect due to hot carrier degradation of a TFT in a scanning signal line drive circuit.

(1) A scanning signal line drive circuit according to some embodiments of the disclosure is a scanning signal line drive circuit configured to drive a plurality of scanning signal lines arranged in a display portion of a display device, the scanning signal line drive circuit includes:

a plurality of unit circuits connected in cascade to form a shift register, in which each unit circuit is configured to determine a state of the unit circuit based on a set signal and a reset signal provided as input signals, and includes an internal node configured to selectively hold voltages of first and second logic levels indicating states of each unit circuit, a set circuit configured to apply a voltage of the first logic level to the internal node when the set signal is active, and a reset circuit configured to apply a voltage of the second logic level to the internal node when the reset signal is active, the reset circuit includes a reset transistor including a drain terminal connected to the internal node, a source terminal, and a gate terminal to which the reset signal is supplied, and the shift register is configured such that, in each unit circuit, a voltage signal is supplied to the source terminal of the reset transistor as a reset state voltage signal, the voltage signal maintaining an active voltage level corresponding to an active state of the reset signal when the reset signal changes from an inactive state to an active state, and changing from the active voltage level to the second logic level before the reset signal changes from the active state to the inactive state.

(2) The scanning signal line drive circuit according to some embodiments of the disclosure includes the configuration of (1), in which the shift register operates based on multi-phase clock signals, the multi-phase clock signal includes a plurality of clock signals cyclically corresponding to the plurality of unit circuits, a pulse of one of two clock signals adjacent to each other among the plurality of clock signals partially overlaps a pulse of the other of the two clock signals, the plurality of unit circuits respectively correspond to the plurality of scanning signal lines, each unit circuit includes an output circuit including an output transistor that is in an on state when a voltage of the first logic level is held in the internal node, and is in an off state when a voltage of the second logic level is held in the internal node, a clock input terminal for receiving a corresponding clock signal among the plurality of clock signals, and an output terminal connected to a corresponding scanning signal line among the plurality of scanning signal lines and connected to the clock input terminal via the output transistor, the output circuit outputs a scanning signal based on the corresponding clock signal from the output terminal to the corresponding scanning signal line, and the shift register is configured such that, in each unit circuit, a scanning signal output from a unit circuit in a stage subsequent to a current stage is supplied to the source terminal of the reset transistor as the reset state voltage signal, and a scanning signal output from an output circuit in a unit circuit subsequent to the unit circuit is supplied to the gate terminal of the reset transistor as the reset signal.

(3) The scanning signal line drive circuit according to some embodiments of the disclosure includes the configuration of (2), in which a number k of phases of the multi-phase clock signal is an integer equal to or greater than 3, and a duty ratio D of the multi-phase clock signal satisfies the following inequality:

$$1/k < D \leq 1 - 1/k,$$

the shift register is configured such that, in each unit circuit, a scanning signal output from a unit circuit of one stage before a current stage or a signal corresponding to the scanning signal is supplied to the set circuit as the set signal, a scanning signal output from a unit circuit of one stage after the current stage is supplied to the source terminal of the reset transistor as the reset state voltage signal, and a scanning signal output from a unit circuit of two stages after the current stage is supplied to the gate terminal of the reset transistor as the reset signal.

(4) The scanning signal line drive circuit according to some embodiments of the disclosure includes the configuration of (2), in which a number k of phases of the multi-phase clock signal is an integer equal to or greater than 4, and a duty ratio D satisfies the following inequality:

$$1/k < D \leq 1 - 2/k,$$

the shift register is configured such that in each unit circuit, a scanning signal output from a unit circuit of two stages before a current stage or a signal corresponding to the scanning signal is supplied to the set circuit as the set signal, a scanning signal output from a unit circuit of one stage after the current stage is supplied to the source terminal of the reset transistor as the reset state voltage signal, and a scanning signal output from a unit circuit of two stages after the current stage is supplied to the gate terminal of the reset transistor as the reset signal.

(5) The scanning signal line drive circuit according to some embodiments of the disclosure includes the configuration of (2), in which the shift register is configured such that, in each unit circuit, a scanning signal output from a unit circuit in a stage preceding a current stage or a signal corresponding to the scanning signal is supplied to the set circuit as the set signal.

(6) The scanning signal line drive circuit according to some embodiments of the disclosure includes any one of the configurations of (1) to (5), in which the set circuit includes a transistor of a diode connection configuration including a drain terminal and a gate terminal that are supplied with the set signal and including a source terminal connected to the internal node.

(7) The scanning signal line drive circuit according to some embodiments of the disclosure includes any one of the configurations of (1) to (6), in which the reset transistor is a thin film transistor.

(8) The scanning signal line drive circuit according to some embodiments of the disclosure includes the configuration of (7), in which the reset transistor is a thin film transistor including a channel layer formed of an oxide semiconductor.

(9) A display device according to some embodiments of the disclosure includes any one of the scanning signal line drive circuits of (1) to (8), in which the scanning signal line drive circuit and the display portion are integrally formed on an identical substrate.

In some embodiments of the disclosure, in the scanning signal line drive circuit for driving the plurality of scanning signal lines arranged in the display portion of the display device, the shift register includes the plurality of cascade-connected unit circuits. Each unit circuit is configured to determine a state of each unit circuit based on the set signal and the reset signal each supplied as the input signal, and includes the internal node configured to selectively hold the voltages of the first and second logic level indicating the state of each unit circuit, the set circuit configured to apply the voltage of the first logic level to the internal node when the set signal is active, and the reset circuit configured to apply the voltage of the second logic level to the internal node when the reset signal is active. The shift register is configured such that a reset state voltage signal is supplied to a source terminal of the reset transistor, in which the reset state voltage signal maintains an active voltage level corresponding to an active state of the reset signal when the reset signal changes from an inactive state to an active state and changes from the active voltage level to the second logic level before the reset signal changes from the active state to the inactive state. According to such a configuration, in the unit circuit in the state where the voltage of the first logic level is held in the internal node, the drain-source voltage of the reset transistor has a small value at the time when the gate-source voltage of the reset transistor has a value near a threshold voltage of the reset transistor in the process in which the reset transistor changes from the off state to the on state by the change of the reset state voltage signal from the active voltage level to the second logic level (see FIG. 10).

The reset transistor turns to the on state when its gate-source voltage exceeds its threshold voltage in this process, whereby the internal node is discharged and its voltage changes toward the second logic level, thereafter, the drain-source voltage also decreases. Therefore, according to the above-described some embodiments of the disclosure, even when the scanning signal drive circuit is achieved as a monolithic gate driver that drives the display portion with a high drive voltage, the hot carrier degradation of the reset transistor is suppressed or reduced, and the occurrence of display defects due to the hot carrier degradation is suppressed.

BRIEF DESCRIPTION OF DRAWINGS

The disclosure will be described with reference to the accompanying drawings, wherein like numbers reference like elements.

DESCRIPTION OF EMBODIMENTS

Embodiments will be described below with reference to the accompanying drawings. Note that all the transistors in the present embodiment are N-channel transistors, but the disclosure is not limited thereto. In addition, in the N-channel transistor, of the two conduction terminals, one having a higher potential is a drain terminal and one having a lower potential is a source terminal, but in the present description, even in a case where high and low of potentials of the two conduction terminals are inverted during operations, one of the two conduction terminals is fixedly referred to as the "drain terminal" and the other is referred to as the "source terminal". Furthermore, "connection" in the present description means "electrical connection" unless otherwise specified, and in the scope without departing from the subject matters of the disclosure, it includes not only a case to mean direct connection, but also a case to mean indirect connection through other elements.

1. First Embodiment

1.1 Overall Configuration and Operation Outline

Figure 1:
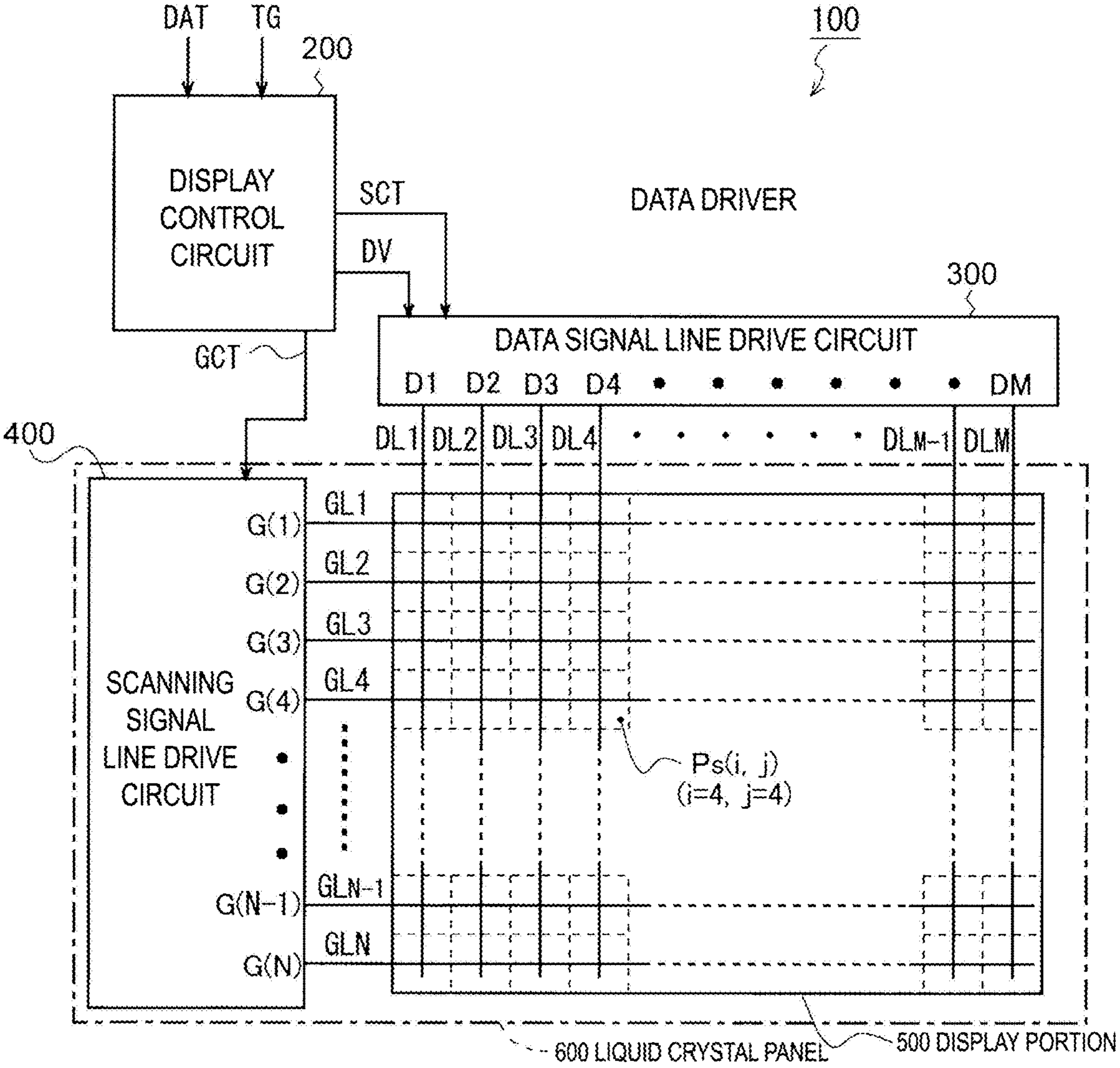
FIG. 1 is a block diagram illustrating an overall configuration of a display device according to a first embodiment.

FIG. 1 is a block diagram illustrating an overall configuration of a display device 100 according to a first embodiment. This display device 100 is an active matrix liquid crystal display device, and includes a display control circuit 200, a data signal line drive circuit 300, a scanning signal line drive circuit 400, and a display portion 500 constituting a liquid crystal panel 600 as a display panel, as illustrated in FIG. 1. In the present embodiment, the scanning signal line drive circuit 400 and the display portion 500 are formed on an identical substrate (on an active matrix substrate that is one of two substrates included in the liquid crystal panel 600). In other words, the scanning signal line drive circuit 400 is a monolithic gate driver (GDM circuit).

The display portion 500 is provided with a plurality (M) of data signal lines DL1 to DLM, a plurality (N) of scanning signal lines GL1 to GLN intersecting the plurality of data signal lines DL1 to DLM, and a plurality (M×N) of pixel forming sections Ps(i, j) (i=1 to N, j=1 to M) arranged in a matrix shape along the plurality of data signal lines DL1 to DLM and the plurality of scanning signal lines GL1 to GLN. Each of the pixel forming sections Ps(i, j) corresponds to one of the plurality of data signal lines DL1 to DLM, and corresponds to one of the plurality of scanning signal lines GL1 to GLN.

Figure 2:
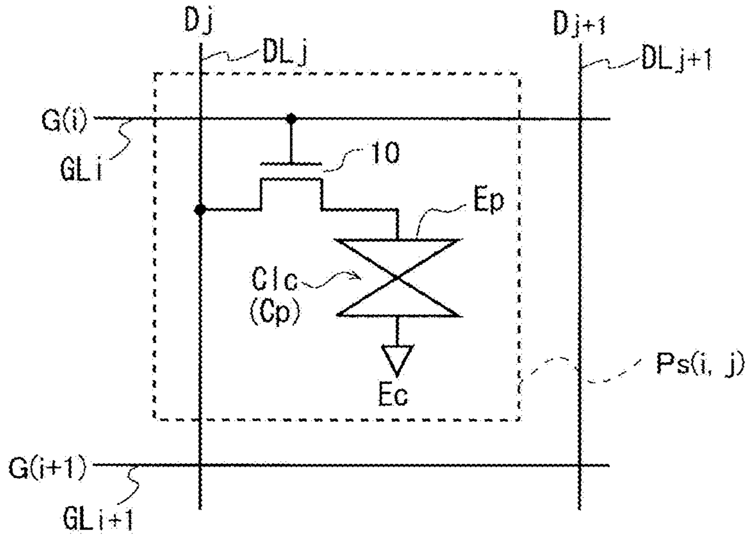
FIG. 2 is a circuit diagram illustrating an electrical configuration of a pixel forming section in the first embodiment.

FIG. 2 is a circuit diagram illustrating an electrical configuration of one pixel forming section Ps(i, j) in the display portion 500. As illustrated in FIG. 2, each pixel forming section Ps(i, j) includes an N-channel type thin film transistor (TFT) 10 serving as a pixel switching element and including a gate terminal connected to a corresponding scanning signal line GLi and a source terminal connected to a corresponding data signal line DLj, a pixel electrode Ep connected to a drain terminal of the transistor 10, a common electrode Ec serving as a counter electrode provided in common to the plurality of pixel forming sections Ps(i, j) (i=1 to N, j=1 to M), and a liquid crystal layer provided in common to the plurality of pixel forming sections Ps(i, j) (i=1 to N, j=1 to M) and sandwiched between the pixel electrode Ep and the common electrode Ec. A pixel capacitance Cp is configured by a liquid crystal capacitance Clc formed by the pixel electrode Ep and the common electrode Ec.

In the present embodiment, as the thin film transistor 10 in the pixel forming section Ps (i, j), a thin film transistor (oxide TFT) using an oxide semiconductor such as IGZO in the channel layer is used, but the present disclosure is not limited thereto. As the thin film transistor 10, a thin film transistor using amorphous silicon for the channel layer (a-Si TFT), a thin film transistor using low-temperature polysilicon for the channel layer (LTPS-TFT), and the like may be employed. The liquid crystal panel 600 as a display panel in the present embodiment is a GDM panel in which the pixel circuit composed of elements formed on the TFT substrate among the pixel forming section Ps (i, j) constituting the display portion 500 and the scanning signal line drive circuit are integrally formed. A transistor in the pixel forming section Ps and a transistor included in the scanning signal line drive circuit are thin film transistors whose channel layers are formed of the same type of semiconductor.

The display control circuit 200 receives an image signal DAT and a timing control signal TG supplied from the outside, and outputs a digital video signal DV, a data side control signal SCT for controlling an operation of the data signal line drive circuit 300, and a scanning side control signal GCT for controlling the scanning signal line drive circuit 400. The data side control signal SCT includes a data start pulse signal, a data clock signal, a latch strobe signal, and the like. The scanning side control signal GCT includes a gate start pulse signal, a gate clock signal, and the like. In the present embodiment, the scanning signal line drive circuit 400 operates by a four-phase gate clock signal (hereinafter, simply referred to as a "four-phase clock signal") including first to fourth clock signals CK1 to CK4.

The data signal line drive circuit 300 applies data signals D1 to DM to the data signal lines DL1 to DLM, respectively, based on the digital video signal DV and the data side control signal SCT from the display control circuit 200. At this time, in the data signal line drive circuit 300, the digital video signals DV indicating voltages each to be applied to a respective one of the data signal lines DL are sequentially held at a timing when pulses of the data clock signal are generated. Then, the held digital video signals DV are converted into analog voltages at a timing when pulses of the latch strobe signal are generated. The converted analog voltages are simultaneously applied, as the data signals D1 to DM, to all of the data signal lines DL1 to DLM.

The scanning signal line drive circuit 400 is arranged on one end side of the scanning signal lines GL1 to GLN, and applies scanning signals G(1) to G(N) to the scanning signal lines GL1 to GLN, respectively, based on the scanning side control signal GCT from the display control circuit 200. Accordingly, each of the active scanning signals (high-level scanning signal in the present embodiment) is sequentially applied to a respective one of the scanning signal lines GL1 to GLN in each frame period, and the application of the active scanning signal to each scanning signal line GLi (i=1 to N) is repeated with one frame period as a cycle. Note that although the scanning signal line drive circuit 400 is achieved as one circuit and arranged on one side of the display portion 500 in the configuration illustrated in FIG. 1, the scanning signal line drive circuit 400 may be arranged separately on one side and the other side of the display portion 500. The same applies to other embodiments described later.

A backlight unit (not illustrated) is provided on a back face side of the display panel 600, so that the back face of the display panel 600 is irradiated with backlight. The backlight unit is also driven by the display control circuit 200, but may be configured to be driven by another method. Note that when the display panel 600 is a reflective type liquid crystal panel, the backlight unit is not necessary.

As described above, the data signals D1 to DM are applied to the data signal lines DL1 to DLM, respectively, and the scanning signals G(1) to G(N) are applied to the scanning signal lines GL1 to GLN, respectively. A predetermined common voltage Vcom is supplied to the common electrode Ec from power source circuit (not illustrated). Further, a signal for driving the backlight is supplied to the backlight. By driving the data signal lines DL1 to DLM, the scanning signal lines GL1 to GLN, the common electrode Ec, and the backlight in the display portion 500 in this way, pixel data based on the digital video signal DV is written into each pixel forming section Ps(i, j), and light is emitted from the backlight to the back face of the display panel 600, whereby an image represented by the image signal DAT applied from the outside is displayed on the display portion 500.

1.2 Configuration and Operation of Scanning Signal Line Drive Circuit

In the present embodiment, as illustrated in FIG. 1, the display portion 500 is provided with N×M pieces of pixel forming sections Ps(1, 1) to PS(N, M). Hereinafter, among the N×M pieces of pixel forming sections Ps(1, 1) to PS(N, M), M pieces of pixel forming sections Ps(i, 1) to Ps(i, M) aligned in an extending direction of the scanning signal line GLi are referred to as a "pixel row" or simply as a "row" (i=1 to N). The scanning signal line drive circuit 400 in the present embodiment is constituted of a shift register operated by the four-phase clock signal, and a circuit constituting each stage of the shift register is hereinafter, referred to as a "unit circuit" (the same applies to other embodiments). A shift register 401 includes n unit circuits 4(1) to 4(N) in one-to-one correspondence with n pixel rows Pix(1, 1) to Pix(1, M), Pix(2, 1) to Pix(2, M), . . . to Pix(N, 1) to Pix(N, M).

Figure 3:
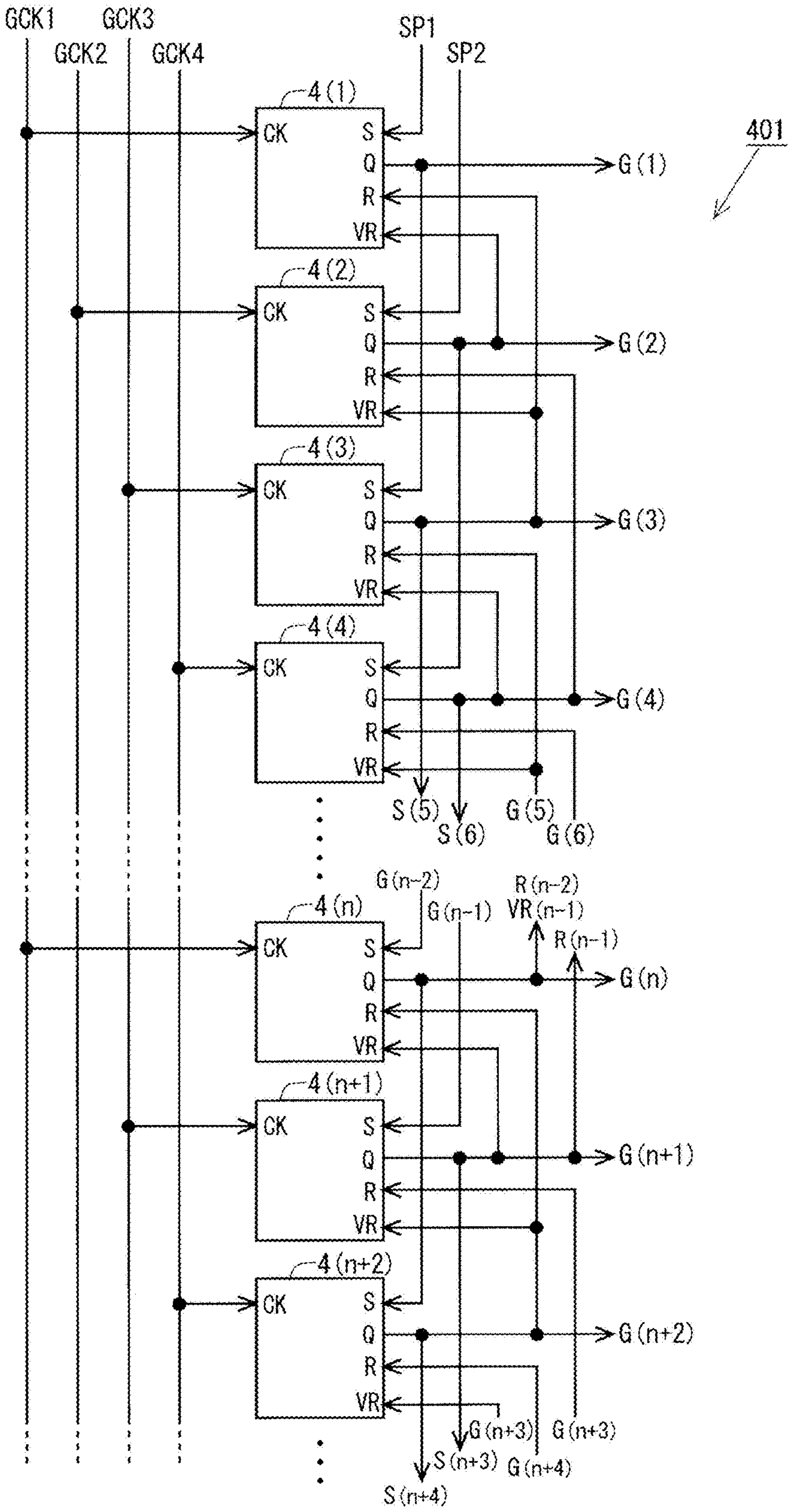
FIG. 3 is a circuit diagram for describing a configuration of a scanning signal line drive circuit in the first embodiment.
Figure 4:
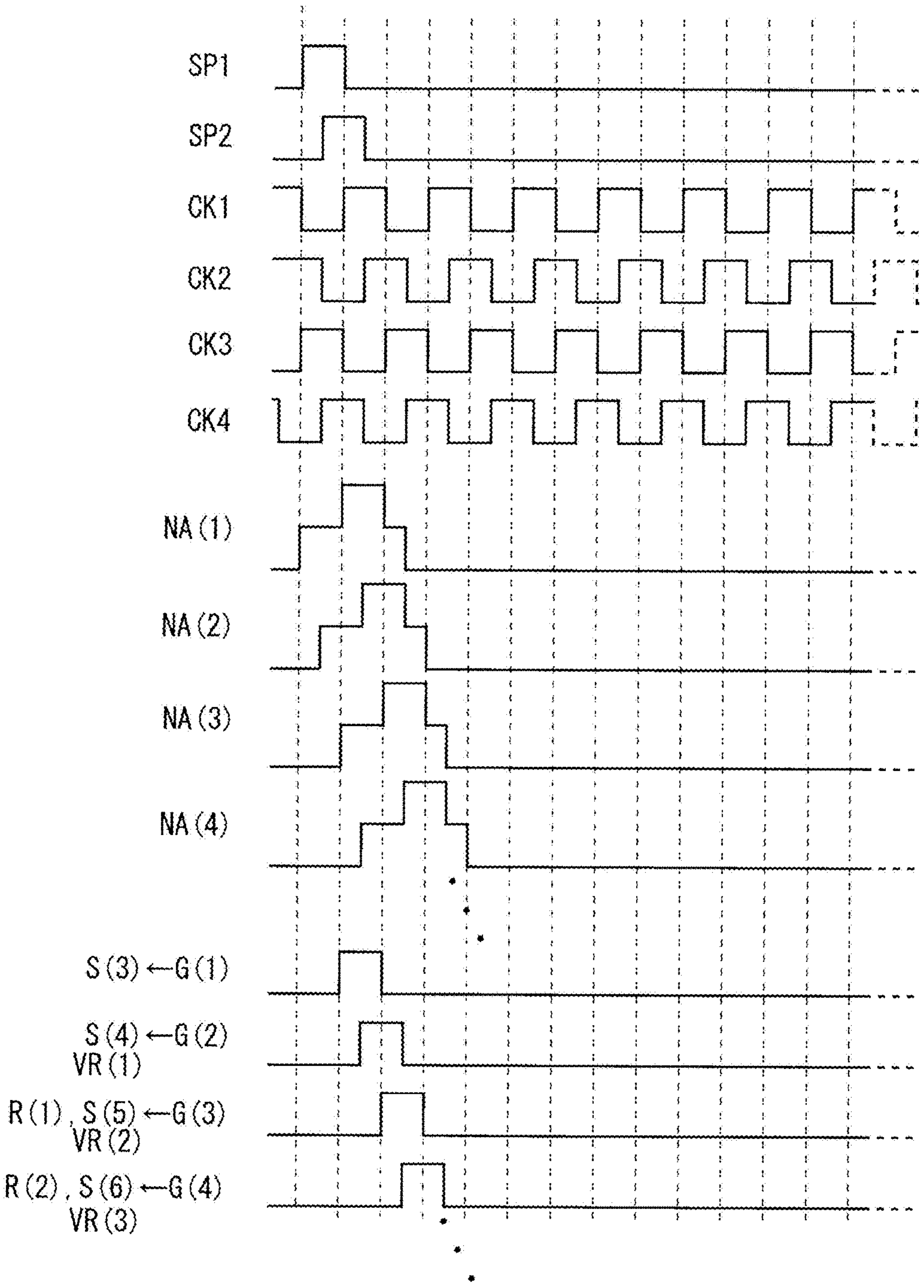
FIG. 4 is a signal waveform diagram for describing operations of the scanning signal line drive circuit in the first embodiment.

FIG. 3 is a circuit diagram for describing the schematic configuration of the shift register 401 constituting the scanning signal line drive circuit 400 in the present embodiment and FIG. 4 is a signal waveform diagram for describing operations of the scanning signal line drive circuit 400 constituted of the shift register 401 illustrated in FIG. 3. The configuration and operation of the scanning signal line drive circuit 400 will be described below with reference to FIGS. 3 and 4.

1.2.1 Configuration of Scanning Signal Line Drive Circuit

The N unit circuits 4(1) to 4(N) included in the shift register 401 constituting the scanning signal line drive circuit 40 are cascade-connected as illustrated in FIG. 3, and each unit circuit 4(*i*) (i=1 to N) has a clock input terminal CK, a set input terminal S, a reset input terminal R, a reset state voltage terminal VR, and an output terminal Q. Hereinafter, signals to be supplied to the clock input terminal CK, the set input terminal S, the reset input terminal R, and the reset state voltage terminal VR are referred to as a clock signal CK, a set signal S, a reset signal R, and a reset state voltage signal VR, respectively, and a signal to be output from the output terminal Q is referred to as a stage output signal Q (here, the same sign is used for a sign indicating a terminal and a sign indicating the signal to be supplied to the terminal or the signal to be output from the terminal). Note that in order to generate the reset signal R and the reset state voltage signal VR to be input to the unit circuit 4(*n*) (n≤N) of up to the Nth stage, dummy unit circuits may be cascade-connected in the Nth and subsequent stages. The same applies to the other embodiments.

In the present embodiment, the gate start pulse signal from the display control circuit 200 includes a first start pulse signal SP1 and a second start pulse signal SP2 as illustrated in FIG. 4, each including one pulse per frame period. As illustrated in FIG. 3, the first start pulse signal SP1 and the second start pulse signal SP2 are supplied to the set input terminals S of a first stage unit circuit 4(1) and a second stage unit circuit 4(2) in the shift register 401, respectively. The first to fourth clock signals CK1 to CK4 illustrated in FIG. 4 constituting the four-phase clock signal cyclically correspond to the unit circuits 4(1), 4(2), 4(3), . . . connected in cascade in the shift register 401 as illustrated in FIG. 3, and the corresponding clock signal among the first to fourth clock signals CK1 to CK4 is supplied to the clock input terminal CK of each unit circuit 4(*i*). In addition, the N stages of unit circuits 4(1) to 4(N) correspond to the N scanning signal lines GL1 to GLN, respectively, and the output terminal Q of each unit circuit (i) is connected to the corresponding scanning signal line GL(i) among the N scanning signal lines GL1 to GLN. Therefore, the stage output signal Q of the nth stage unit circuit (n) is applied as a scanning signal G(n) to the nth scanning signal line GLn. Note that in the following description, for convenience of explanation, even in the case of n=1, 2, in the unit circuit 4(*n*), the output terminal Q of the unit circuit 4(*n*−2) of the second preceding stage is connected to the set input terminal S, and the scanning signal G(n−2), which is the stage output signal Q of the unit circuit 4(*n*−2) of the second preceding stage, is supplied to the set input terminal S.

As illustrated in FIG. 3, in the nth stage unit circuit 4(*n*) (1≤n≤N), the output terminal Q of the unit circuit 4(*n*−2) of the second preceding stage is connected to the set input terminal S, the output terminal Q of the unit circuit 4(*n*+2) of the second subsequent stage is connected to the reset input terminal R, and the output terminal Q of the unit circuit 4(*n*+1) of the next stage (first subsequent stage) is connected to the reset state voltage terminal VR.

1.2.2 Unit Circuit

Figure 5:
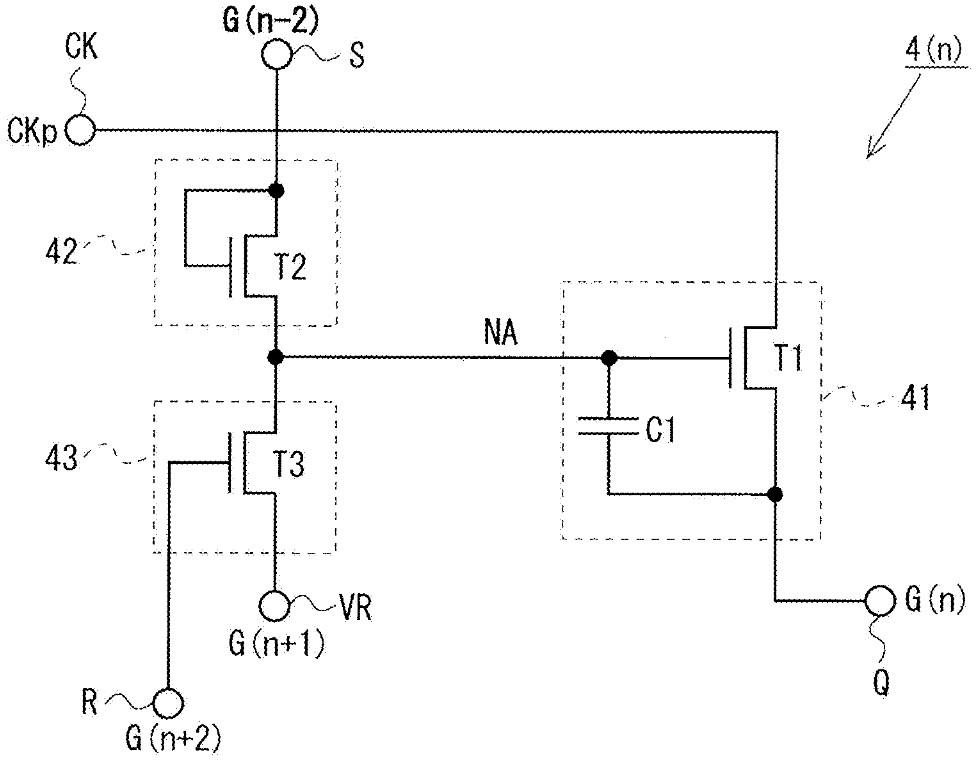
FIG. 5 is a circuit diagram illustrating a configuration of a unit circuit of the scanning signal line drive circuit in the first embodiment.

FIG. 5 is a circuit diagram illustrating a configuration of the nth stage unit circuit 4(*n*) in the present embodiment (1≤n≤N). As illustrated in FIG. 5, the unit circuit 4(*n*) includes three N-channel transistors T1 to T3 (these transistors T1 to T3 are all oxide TFTs, and are hereinafter referred to as an "output transistor T1", a "set transistor T2", and a "reset transistor T3") that function as a switching element, and one capacitor C1. In the unit circuit 4(*n*), the clock signal corresponding to the unit circuit 4(*n*) among the first to fourth clock signals CK1 to CK4 is supplied as an input clock signal CKp to the clock input terminal CK, the scanning signal G(n−2) output from the unit circuit 4(*n*−2) of the second preceding stage is supplied to the set input terminal S, the scanning signal G(n+2) output from the unit circuit 4(*n*+2) of the second subsequent stage is supplied to the reset input terminal R, the scanning signal G(n+1) output from the unit circuit 4(*n*+1) of the next stage is supplied to the reset state voltage terminal VR, and the stage output signal Q is output from the output terminal of the unit circuit 4(*n*) as the scanning signal G(n) and is applied to the nth scanning signal line GLn.

The unit circuit 4(*n*) includes an internal node NA that selectively holds a voltage of a high level (H level) as a first logic level indicating a state of the unit circuit 4(*n*) and a voltage of a low level (L level) as a second logic level, and is in the set state when the voltage of the first logic level is held in the internal node NA and in the reset state when the voltage of the second logic level is held in the internal node NA. As illustrated in FIG. 5, the set transistor T2 has a drain terminal connected to the set input terminal S, a source terminal connected to the internal node NA, and a gate terminal connected to the drain terminal to form a diode-connected configuration. The reset transistor T3 has a drain terminal connected to the internal node NA, a source terminal connected to the reset state voltage terminal VR, and a gate terminal connected to the reset input terminal R. The output transistor T1 has a drain terminal connected to the clock input terminal CK, a source terminal connected to the output terminal Q, and a gate terminal connected to the internal node NA. The capacitor C1 includes a first terminal and a second terminal connected to the source terminal and the gate terminal of the output transistor T1, respectively, and functions as a so-called bootstrap capacitance. Note that in the unit circuit 4(*n*), the diode-connected set transistor T2 constitutes a set circuit 42, the reset transistor T3 constitutes a reset circuit 43, and the output transistor T1 and the capacitor C1 constitute an output circuit 41. The set circuit 42 is not limited to the configuration illustrated in FIG. 5, and may be configured to supply a voltage of the H level to the internal node NA only when a signal supplied to the set input terminal S is at the H level.

1.2.3 Operation of Scanning Signal Line Drive Circuit

Figure 6:
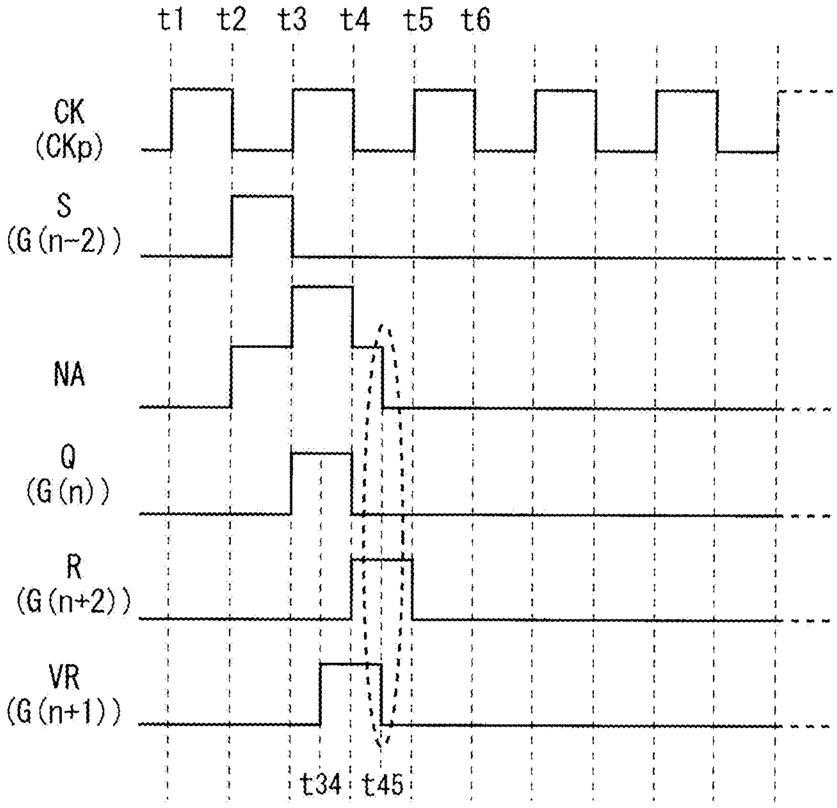
FIG. 6 is a signal waveform diagram for describing operations of the unit circuit in FIG. 5 in the first embodiment.

FIG. 6 is a signal waveform diagram for describing operations of the unit circuit 4(*n*) illustrated in FIG. 5. Hereinafter, the operation of the scanning signal line drive circuit 400 will be described with reference to FIG. 6 together with FIG. 4.

In the unit circuit 4(*n*), as illustrated in FIG. 6, at a time t1, the scanning signal G(n−2) as the set signal S, the scanning signal G(n+2) as the reset signal R, the scanning signal G(n+1) as the reset state voltage signal VR, the voltage of the internal node NA, and the scanning signal G(n) as the stage output signal Q are all at the L level. At this time, the transistors T1 to T3 are in an off state.

When the clock signal CK and the scanning signal G(n−2) as the set signal S as illustrated in FIG. 6 are supplied to the clock input terminal CK and the set input terminal S, respectively, the voltage of the H level as the first logic level is supplied from the set input terminal S to the internal node NA via the set transistor T2 having the diode connection configuration during the period from a time t2 to a time t3 (period t2 to t3). As a result, the voltage of the internal node NA turns to the H level as the first logic level, and thus the output transistor T1 turns to an on state. When the transistor T1 turns to the on state, the input clock signal CKp supplied to the clock input terminal CK is output from the output terminal Q as the scanning signal G(n). This scanning signal G(n) changes from the L level to the H level at the time t3, so that the voltage of the internal node NA is pushed up via the capacitor C1 to turn to a higher voltage than the H level. As a result, the output transistor T1 turns to completely the on state, so that the voltage of the scanning signal G(n) output to the scanning signal line GLn turns to completely the H level and the scanning signal line GLn is in a select state.

Thereafter, at a time t4, the input clock signal CKp changes from the H level to the L level, so that the scanning signal G(n) output from the output terminal Q to the scanning signal line GLn changes from the H level to the L level and the scanning signal line GLn is discharged to turn to a non-select state. Additionally, the voltage of the internal node NA decreases in response to the change of the scanning signal G(n) from the H level to the L level.

In this way, the scanning signal G(n) output from the unit circuit 4(*n*) is at the H level during the period of the time t3 to the time t4 and is maintained at the L level until the time corresponding to the time t3 in the next frame period. As described above, the first to fourth clock signals CK1 to CK4 as illustrated in FIG. 4 cyclically correspond to the unit circuits 4(1), 4(2), 4(3), 4(4), . . . in the scanning signal line drive circuit 400 (FIG. 3), and the corresponding clock signal among the first to fourth clock signals CK1 to CK4 is applied to each unit circuit 4(*i*) as the input clock signal CKp. Thus, in the adjacent unit circuits 4(*i*) and 4(*i*+1), the pulses of the clock signals input thereto partially overlap (see FIG. 4), and as a result, the pulses of the scanning signals G(i) and G(i+1) output therefrom also partially overlap. Therefore, in the unit circuits 4(1), 4(2), 4(3), 4(4), . . . , the voltages of the internal nodes NA(1), NA(2), NA(3), NA(4), . . . and the scanning signals G(1), G(2), G(3), G(4), . . . as the stage output signals Q change as illustrated in FIG. 4. Note that in FIG. 4, "NA(i)" indicates the voltage of the internal node NA in the ith stage unit circuit 4(*i*).

Since the clock signal is input to each unit circuit 4(*i*) (i=1, 2, 3, 4, . . . ) in the scanning signal line drive circuit 400 as described above, in the nth stage unit circuit 4(*n*) illustrated in FIG. 5, the pulse of the nth scanning signal G(n) which is the stage output signal Q partially overlaps the pulse of the (n+1)th scanning signal G(n+1) supplied to the reset state voltage terminal VR, and the pulse of the (n+1)th scanning signal G(n+1) partially overlaps the (n+2)th scanning signal G(n+2) supplied to the reset input terminal R, as illustrated in FIG. 6.

In the examples illustrated in FIGS. 4 and 6, the phases of the first to fourth clock signals CK1 to CK4 are sequentially shifted by ¼ cycle period, and the duty ratio, which is the ratio of the H level period (pulse duration) to the clock cycle, is ½. In the unit circuit 4(*n*), therefore, as illustrated in FIG. 6, the scanning signal G(n+1) supplied to the reset state voltage terminal VR changes from the L level to the H level at a time t34 when the ¼ cycle period has elapsed since the scanning signal G(n) which is the stage output signal Q changed from the L level to the H level at the time t3, and the scanning signal G(n) which is the stage output signal Q changes to the L level and the scanning signal G(n+2) supplied to the reset input terminal R changes from the L level to the H level at the time t4 when the ¼ cycle period has elapsed from the time t34. Thereafter, the scanning signal G(n+1) supplied to the reset state voltage terminal VR changes to the L level at a time t45 when the ¼ cycle period has elapsed from the time t4, and the scanning signal G(n+2) supplied to the reset input terminal R changes to the L level at a time t5 when the ¼ cycle period has elapsed from the time t45.

In the process in which the scanning signals G(n+1) and G(n+2) supplied to the reset state voltage terminal VR and the reset input terminal R of the unit circuit 4(*n*), respectively, change as described above, the scanning signal G(n+2) as the reset signal R changes from the L level to the H level at the time t4, but at this time, the reset transistor T3 maintains the off state because the scanning signal G(n+1) as the reset state voltage signal VR supplied to the source terminal thereof is at the H level. Thus, the voltage of the internal node NA is at the H level as the first logic level even after the time t4. Thereafter, at the time t45, the reset transistor T3 changes to the on state because the scanning signal G(n+1) as the reset state voltage signal VR supplied to the source terminal thereof changes to the L level and the scanning signal G(n+2) as the reset signal R supplied to the gate terminal thereof is at the H level. As a result, the internal node NA is discharged and the voltage thereof changes to the L level as the second logic level. Thereafter, at the time t5, the scanning signal G(n+2) as the reset signal R supplied to the gate terminal of the reset transistor T3 changes to the L level, so that the reset transistor T3 turns to the off state.

1.2.4 Problems in Known Scanning Signal Line Drive Circuit

Next, before describing the effects of the scanning signal line drive circuit 400 according to the present embodiment as described above, problems in the known scanning signal line drive circuit will be described with reference to FIGS. 7 and 8.

Figure 7:
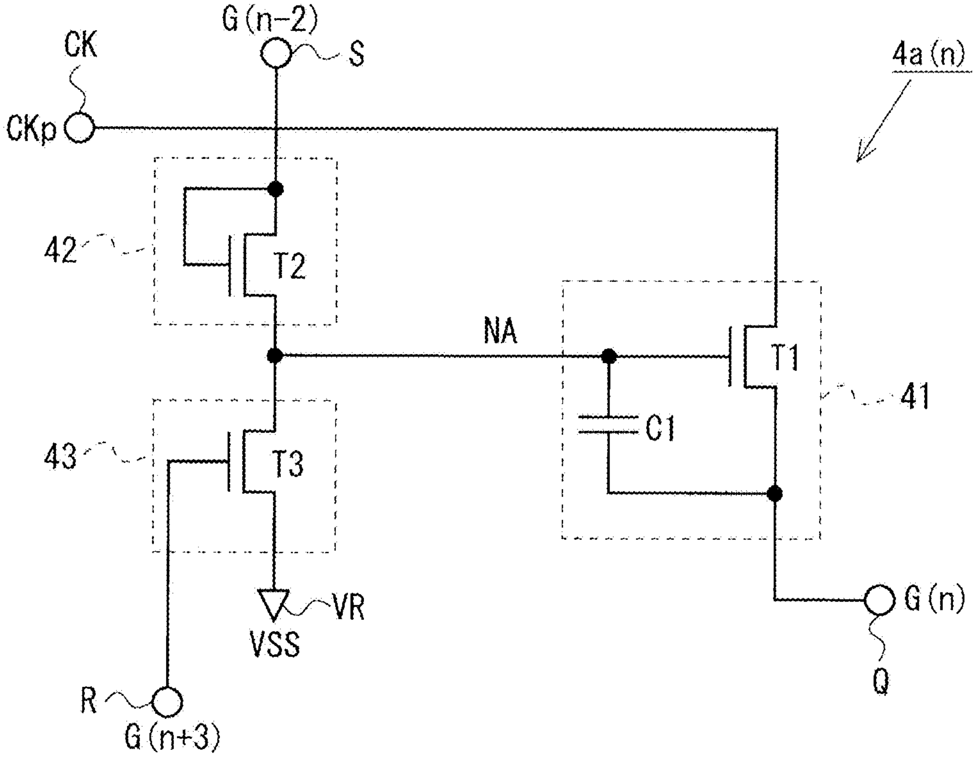
FIG. 7 is a circuit diagram illustrating a configuration of a unit circuit of a known scanning signal line drive circuit.

FIG. 7 is a circuit diagram illustrating a configuration of an nth stage unit circuit 4*a*(*n*) in a known scanning signal line drive circuit (hereinafter referred to as a "known example"). Similarly to the unit circuit 4(*n*) in the present embodiment (see FIG. 5), also the unit circuit 4*a*(*n*) includes the clock input terminal CK, the set input terminal S, the reset input terminal R, the reset state voltage terminal VR, and the output terminal Q, and includes the three N-channel transistors T1 to T3 (the output transistor T1, the set transistor T2, and the reset transistor T3) as switching elements connected as illustrated in FIG. 7 and one capacitor C1. However, in the nth stage unit circuit 4(*n*) in the present embodiment, the scanning signal G(n+1) output from the next stage unit circuit is supplied to the reset state voltage terminal VR and the scanning signal G(n+2) output from the second subsequent stage unit circuit is supplied to the reset input terminal R, whereas, in the unit circuit 4*a*(*n*) in the known example, a low-level power supply voltage VSS, which is a fixed voltage, is supplied to the reset state voltage terminal VR, and the scanning signal G(n+3) output from the unit circuit of the third subsequent stage is supplied to the reset input terminal R. To the set input terminal S of the unit circuit 4*a*(*n*) in the known example, the scanning signal G(n−2) output from the unit circuit of the second preceding stage is supplied similarly to the unit circuit 4(*n*) in the present embodiment. It is assumed that the scanning signal line drive circuit of the known example is operated by the four-phase clock signal including the first to fourth clock signals CK1 to CK4 illustrated in FIG. 4, similarly to the present embodiment.

Figure 8:
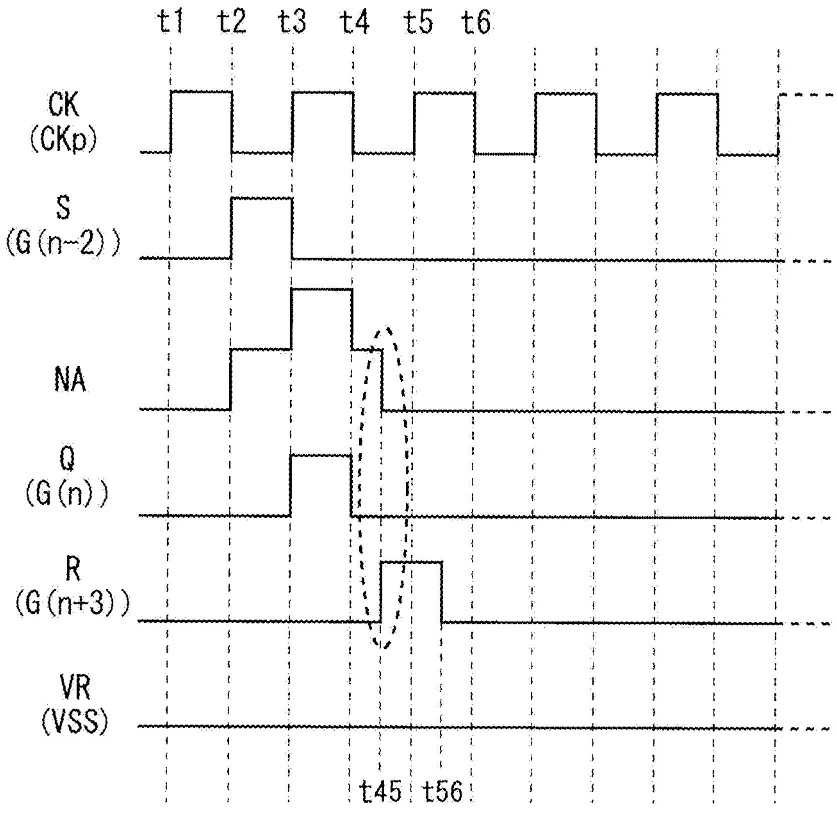
FIG. 8 is a signal waveform diagram for describing operations of the unit circuit of the known scanning signal line drive circuit.

FIG. 8 is a signal waveform diagram for describing operations of the nth stage unit circuit 4*a*(*n*) in the known example illustrated in FIG. 7. As illustrated in FIG. 7, in the unit circuit 4*a*(*n*), based on the input clock signal CKp supplied to the clock input terminal CK and the scanning signal G(n−2) supplied to the set input terminal S, the voltage of the internal node NA and the scanning signal G(n) which is the stage output signal Q change from the time t1 to the time t4 in the same manner as in the unit circuit 4(*n*) in the present embodiment (see FIG. 6).

At the time t4, the input clock signal CKp changes from the H level to the L level, so that the scanning signal G(n) output from the output terminal Q changes from the H level to the L level. The voltage of the internal node NA decreases in response to the change of the input clock signal CKp from the H level to the L level.

The scanning signal G(n+3) supplied to the reset input terminal R changes from the L level to the H level at the time t45 when the ¼ cycle period of the input clock signal CKp has elapsed from the time 4. Since the low-level power supply voltage VSS, that is, the fixed voltage corresponding to the L level as the second logic level is applied to the source terminal of the reset transistor T3 via the reset state voltage terminal VR, the reset transistor T3 changes from the off state to the on state at the time t45 in response to the change of the scanning signal G(n+3) as the reset signal R from the L level to the H level. As a result, the internal node NA is discharged and the voltage thereof changes to the L level as the second logic level. Thereafter, at a time t56, the reset transistor T3 turns to the off state when the scanning signal G(n+3) as the reset signal R changes to the L level.

Figure 9:
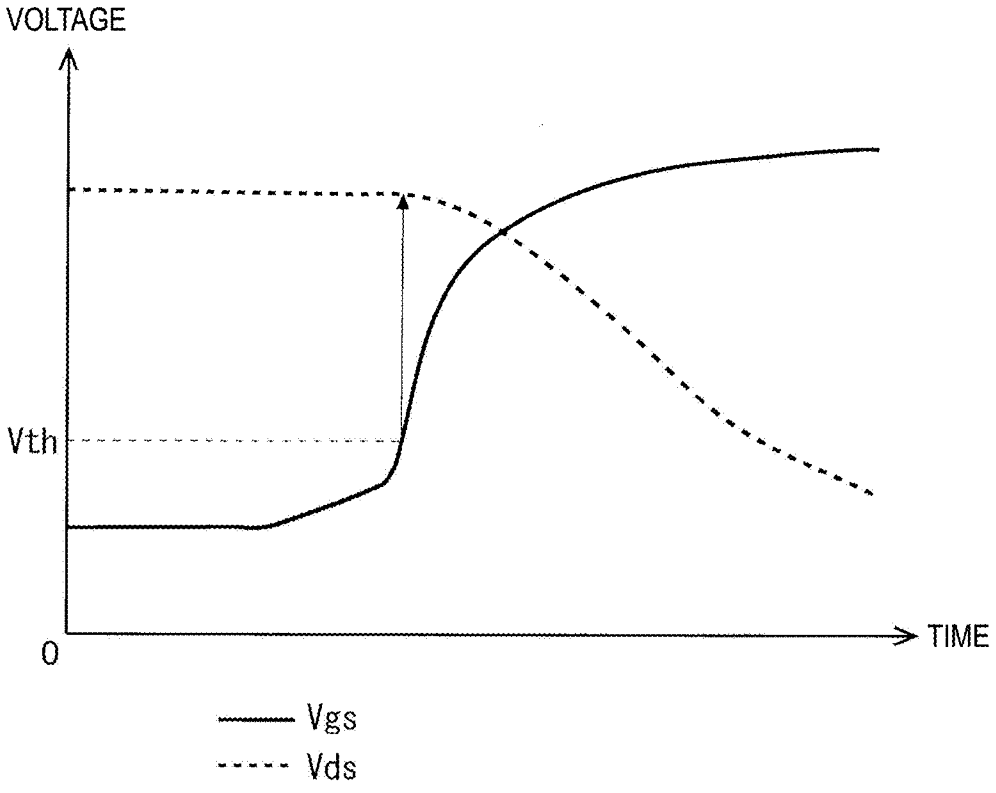
FIG. 9 is a diagram for describing a problem in the unit circuit of the known scanning signal line drive circuit.

FIG. 9 is a diagram for describing a problem in the unit circuit 4$a$($n$) in the known example, and illustrates changes of a voltage Vgs applied between the gate and the source in the reset transistor T3 (hereinafter, simply referred to as a "gate-source voltage") and a voltage Vds applied between the drain and the source in the reset transistor T3 (hereinafter simply referred to as a "drain-source voltage") in a period near the time t45 (a period before and after the reset transistor T3 changes from the off state to the on state) in the above-described operation of the unit circuit 4$a$($n$) (see a portion surrounded by a dotted ellipse in FIG. 8). In FIG. 9, the thick solid line represents the gate-source voltage Vgs, and the thick dotted line represents the drain-source voltage Vds.

In the reset transistor T3, the low-level power supply voltage VSS is applied to the source terminal thereof, and the voltage of the internal node NA connected to the drain terminal thereof is at the H level immediately before the scanning signal G(n+3) supplied to the gate terminal thereof changes from the L level to the H level. Therefore, as illustrated in FIG. 9, the drain-source voltage Vds has a large value at the time when the gate-source voltage Vgs has a value near a threshold voltage Vth of the reset transistor T3 in the process in which the scanning signal G(n+3) as the reset signal R changes from the L level to the H level. As a result, a strong stress is applied to the reset transistor T3, so that the internal node NA cannot be appropriately discharged, which may cause a display defect. That is, high-energy carriers accelerated by a high electrical field inside the TFT as the reset transistor T3 are injected into a gate oxide film to vary the characteristics of the TFT (this phenomenon is referred to as "hot carrier degradation"), and as a result, the internal node NA cannot be appropriately discharged, which may cause the display defect. Since the drive voltage tends to increase due to an increase in the size and frequency of a display panel such as a liquid crystal panel, it is important to address such a problem caused by hot carrier degradation in this way.

Note that JP 2015-181083 A describes a drive circuit functioning as a shift register in a display device or the like, and this drive circuit is configured to reduce a value of a negative bias voltage applied to a thin film transistor (TFT) used for a set operation by charging an internal node in each stage of the shift register so as not to apply a large stress to the TFT, in order to reduce deterioration of the TFT. However, this publication does not describe a configuration for reducing the hot carrier degradation of the TFT corresponding to the reset transistor T3.

1.3 Effects

As described above, the scanning signal line drive circuit 400 in the present embodiment operates based on the first to fourth clock signals CK1 to CK4 as illustrated in FIG. 4, and as illustrated in FIG. 4, the unit circuit 4($n$) of each stage outputs the scanning signal G(n) (n=1, 2, 3, . . . ) as the stage output signal Q so that the pulses of the scanning signals G(i) and G(i+1) to be applied to adjacent scanning signal lines partially overlap. In the unit circuit 4($n$) outputting the scanning signal G(n) described above, unlike the unit circuit 4$a$($n$) in the known example, as illustrated in FIG. 5, the scanning signal G(n+1) is supplied to the source terminal of the reset transistor T3 as the reset state voltage signal VR from the unit circuit of the next stage (first subsequent stage), and the scanning signal G(n+2) is supplied to the gate terminal of the reset transistor T3 as the reset signal R from the unit circuit of the second subsequent stage. According to the present embodiment, it is possible to suppress or reduce the hot carrier degradation which is a problem in the known example. Now, this point will be described with reference to FIG. 10.

Figure 10:
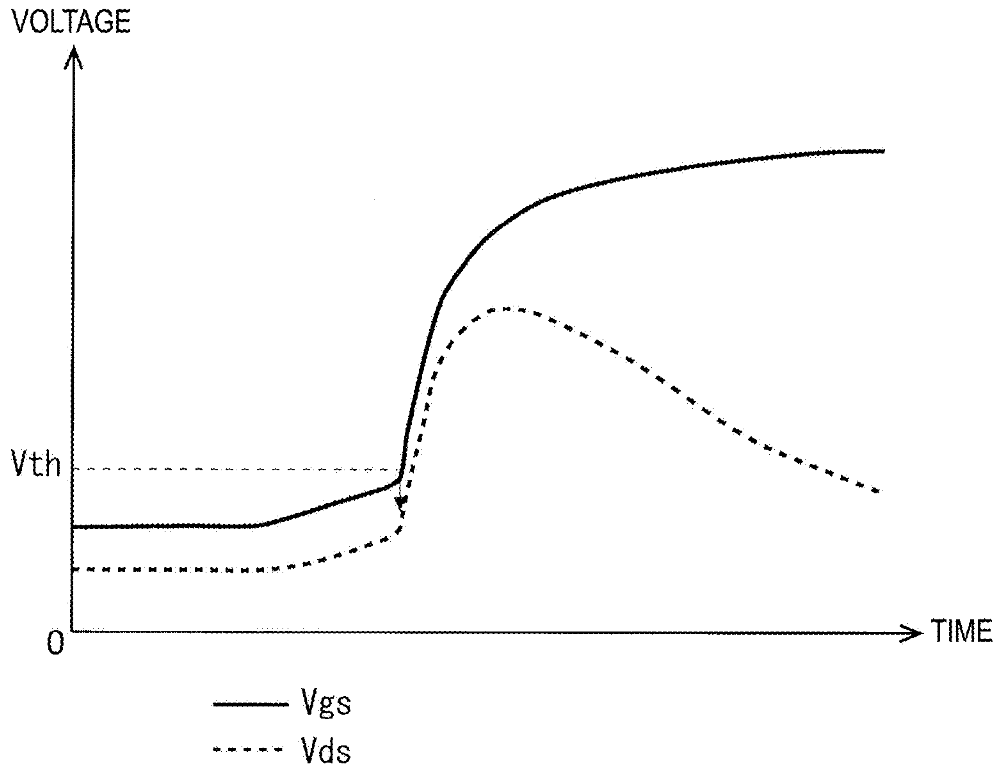
FIG. 10 is a diagram for describing the effect of the first embodiment.

FIG. 10 is a diagram for describing the effect of the present embodiment, and illustrates changes of the gate-source voltage Vgs and the drain-source voltage Vds in the reset transistor T3 in a period near the time t45 (a period before and after the reset transistor T3 changes from the off state to the on state) in the above-described operation of the unit circuit 4($n$) in the present embodiment illustrated in FIG. 6 (see a portion surrounded by a dotted ellipse in FIG. 6). In FIG. 10, the thick solid line represents the gate-source voltage Vgs, and the thick dotted line represents the drain-source voltage Vds.

As illustrated in FIG. 6, the scanning signal G(n+1) supplied to the unit circuit 4($n$) in the present embodiment from the unit circuit of the next stage as the reset state voltage signal VR changes from the L level to the H level at the time t34, and maintains the H level until the time t45. Since the drain and source terminals of the reset transistor T3 are connected to the internal node NA and the reset state voltage terminal VR, respectively (FIG. 5), the drain-source voltage Vds has a sufficiently small value near 0 during the period from the time t4 when the voltage of the internal node NA drops to the H level due to the change of the input clock signal CKp from the H level to the L level to the time t45 when the discharge of the internal node NA starts due to the change of the reset transistor T3 to the on state. At the time t4, the scanning signal G(n+2) supplied to the gate terminal of the reset transistor T3 as the reset signal R changes from the L level to the H level, but the reset transistor T3 maintains the off state because the scanning signal G(n+1) supplied to the source terminal thereof as the reset state voltage signal VR is at the H level. Thereafter, at the time t45, when the scanning signal G(n+1) supplied to the source terminal of the reset transistor T3 as the reset state voltage signal VR changes from the H level to the L level, the gate-source voltage Vgs becomes larger than the threshold voltage Vth of the reset transistor T3, so that the reset transistor T3 changes from the off state to the on state. As a result, the internal node NA is discharged and the voltage thereof changes to the L level as the second logic level. The scanning signal G(n+2) supplied to the gate terminal of the reset transistor T3 as the reset signal R is at the H level from the time t4 to the time t5, and at the time t45 between the time t4 and the time t5, the scanning signal G(n+1) supplied to the source terminal of the reset transistor T3 as the reset state voltage signal VR changes from the H level to the L level. Therefore, the drain-source voltage Vds has a small value at the time when the gate-source voltage Vgs has a value near the threshold voltage Vth of the reset transistor T3 in the process in which the scanning signal G(n+1) as the reset state voltage signal changes from the H level to the L level. In this process, when the gate-source voltage Vgs exceeds the threshold voltage Vth of the reset transistor T3, the reset transistor T3 turns to the on state, whereby the internal node NA is discharged and the voltage thereof changes toward the L level (second logic level), and then the drain-source voltage Vds also decreases.

By such an operation, the gate-source voltage Vgs and the drain-source voltage Vds in the reset transistor T3 change as illustrated in FIG. 10 in a period near the time t45 (a period before and after the reset transistor T3 changes from the off state to the on state). As illustrated in FIG. 10, the drain-source voltage Vds has a small value at the time when the gate-source voltage Vgs has a value near the threshold voltage Vth of the reset transistor T3 in the process of the reset transistor T3 changing from the off state to the on state. According to the present embodiment, even when a gate driver monolithic panel having a high drive voltage is used as the liquid crystal panel 600, the hot carrier degradation of the TFT as the reset transistor T3 in the scanning signal line drive circuit 400 is suppressed or reduced, so that the occurrence of a display defect due to the hot carrier degradation can be suppressed.

Note that although the scanning signal G(n−2) output from the unit circuit 4(*n*−2) two stages before the unit circuit 4(*n*) is supplied to the set input terminal S of the unit circuit 4(*n*) in the present embodiment (see FIG. 5), the scanning signal G(n−1) output from the unit circuit 4(*n*−1) one stage before the unit circuit 4(*n*) may be supplied instead. Even in such a configuration, the scanning signal line drive circuit 400 operates substantially in the same manner, and the same effect can be obtained.

2. Second Embodiment

Next, a display device according to a second embodiment will be described. The display device according to the present embodiment is also an active matrix liquid crystal display device, and the overall configuration is as illustrated in FIG. 1 as in the first embodiment, and the electrical configuration of each pixel forming section Ps(i, j) is also as illustrated in FIG. 1 as in the first embodiment. Also in the present embodiment, the scanning signal line drive circuit is a monolithic driver (GDM circuit), but the scanning signal line drive circuit in the present embodiment is different from the scanning signal line drive circuit (see FIG. 3 and FIG. 4) in the first embodiment which operates by a four-phase clock signal in that the scanning signal line drive circuit operates by a three-phase clock signal. The scanning signal line drive circuit in the present embodiment will be described below and detailed description of other parts will be omitted. Note that in the configurations of the display device according to the present embodiment, portions that are the same as or corresponding to those of the above-described first embodiment are assigned the same reference signs.

Figure 11:
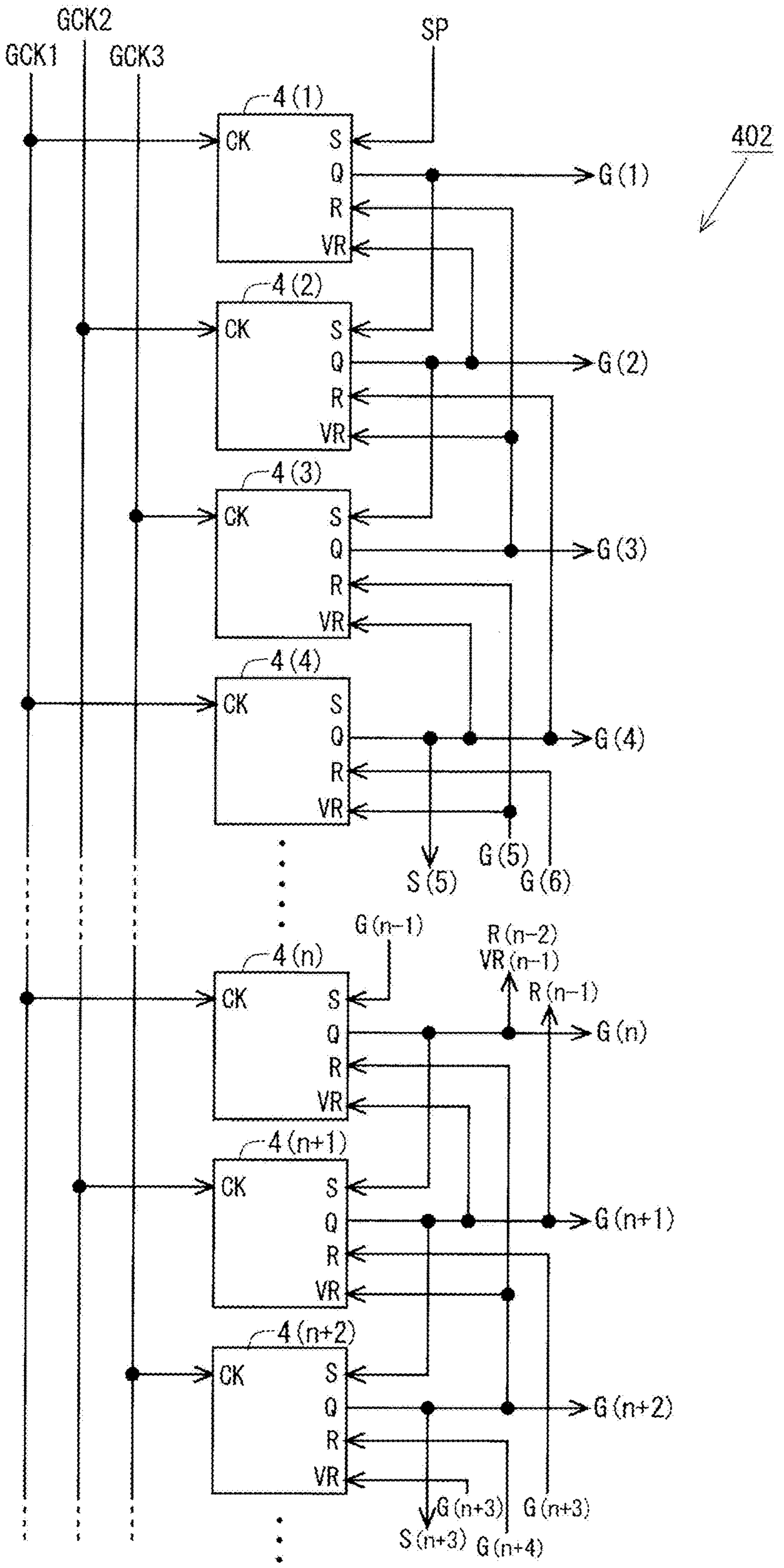
FIG. 11 is a circuit diagram for describing a configuration of a scanning signal line drive circuit in a display device according to a second embodiment.
Figure 12:
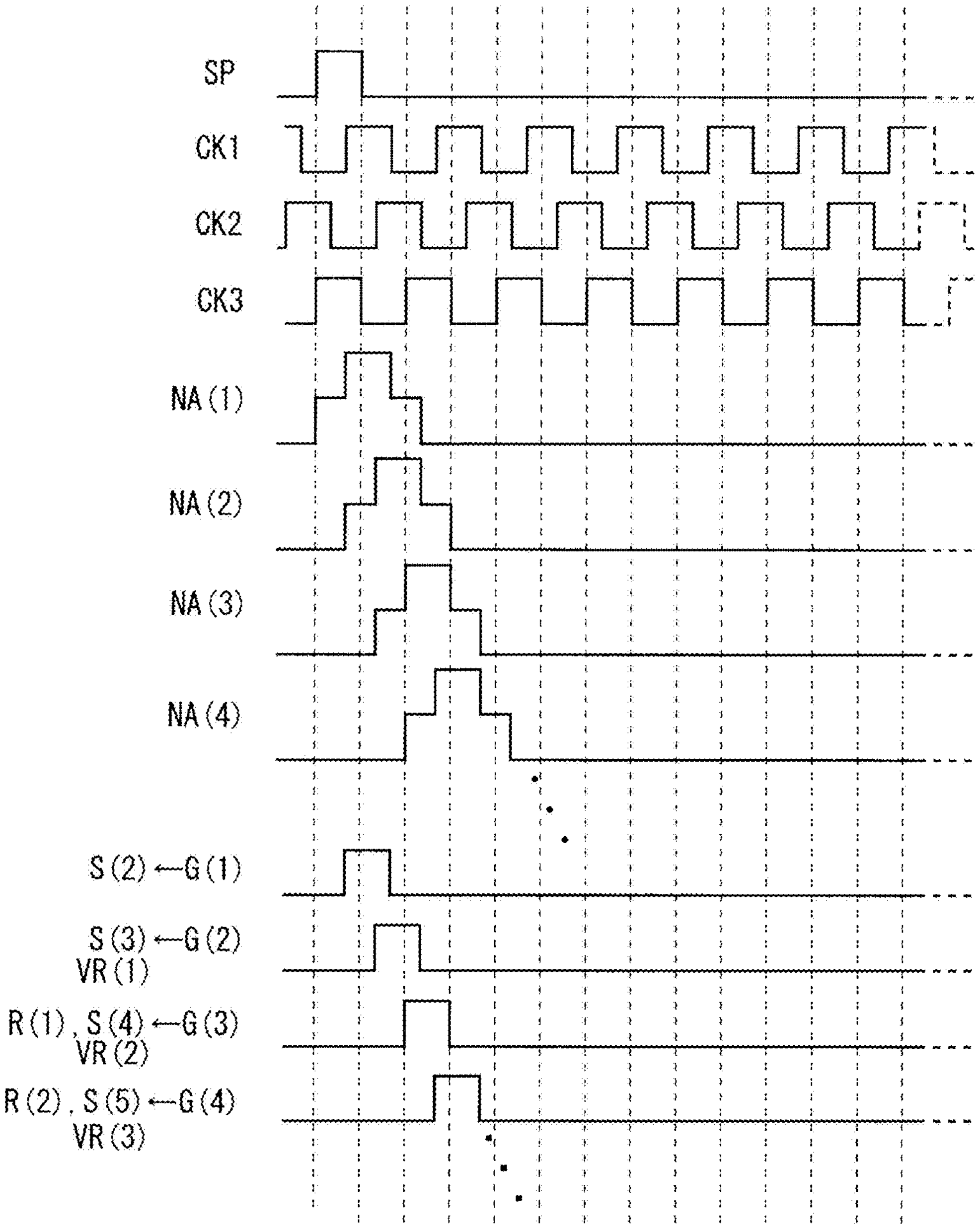
FIG. 12 is a signal waveform diagram for describing operations of the scanning signal line drive circuit in the second embodiment.

FIG. 11 is a circuit diagram for describing a schematic configuration of a shift register 402 constituting the scanning signal line drive circuit 400 in the present embodiment, and FIG. 12 is a signal waveform diagram for describing operations of the scanning signal line drive circuit 400 constituted by the shift register 402 illustrated in FIG. 11. The configuration and operations of the scanning signal line drive circuit 400 will be described below with reference to FIGS. 11 and 12.

The shift register 402 constituting the scanning signal line drive circuit 400 in the present embodiment is operated by the three-phase clock signal including the first to third clock signals CK1 to CK3 as illustrated in FIG. 12, the first to third clock signals CK1 to CK3 cyclically correspond to the unit circuits 4(1), 4(2), 4(3), . . . in the shift register 402, and the corresponding clock signal among the first to third clock signals CK1 to CK3 is input to each unit circuit 4(*i*). Therefore, as illustrated in FIG. 11, the connection relationship between the signal lines transmitting the first to third clock signals CK1 to CK3 and each unit circuit 4(*i*) (i=1, 2, 3, . . . ) is different from that of the shift register 401 in the first embodiment, and additionally, the set signal S (the signal supplied to the set input terminal S) input to each unit circuit 4(*i*) is also different (details will be described later), but the connection configuration other than these different points in the shift register 402 is the same as that of the shift register 401 in the first embodiment (see FIG. 3).

In the first to third clock signals CK1 to CK3 used in the shift register 402 in the present embodiment, the duty ratio D is a real number satisfying $1/3<D<2/3$, and as illustrated in FIG. 12, pulses partially overlap between two adjacent clock signals CKq and CKq+1 among the first to third clock signals CK1 to CK3 (q is an integer satisfying $1 \le q \le 3$, where, when q=3, CKq+1 is replaced with CK1). However, as described below, each unit circuit 4(*i*) in the present embodiment operates substantially in the same manner as each unit circuit 4(*i*) in the first embodiment described above (i=1 to N). For this reason, also in the present embodiment, as illustrated in FIG. 12, the voltage of the internal node NA(i) of each unit circuit 4(*i*) and the scanning signal G(i) output from each unit circuit 4(*i*) change similarly to the first embodiment (see FIG. 4).

Figure 13:
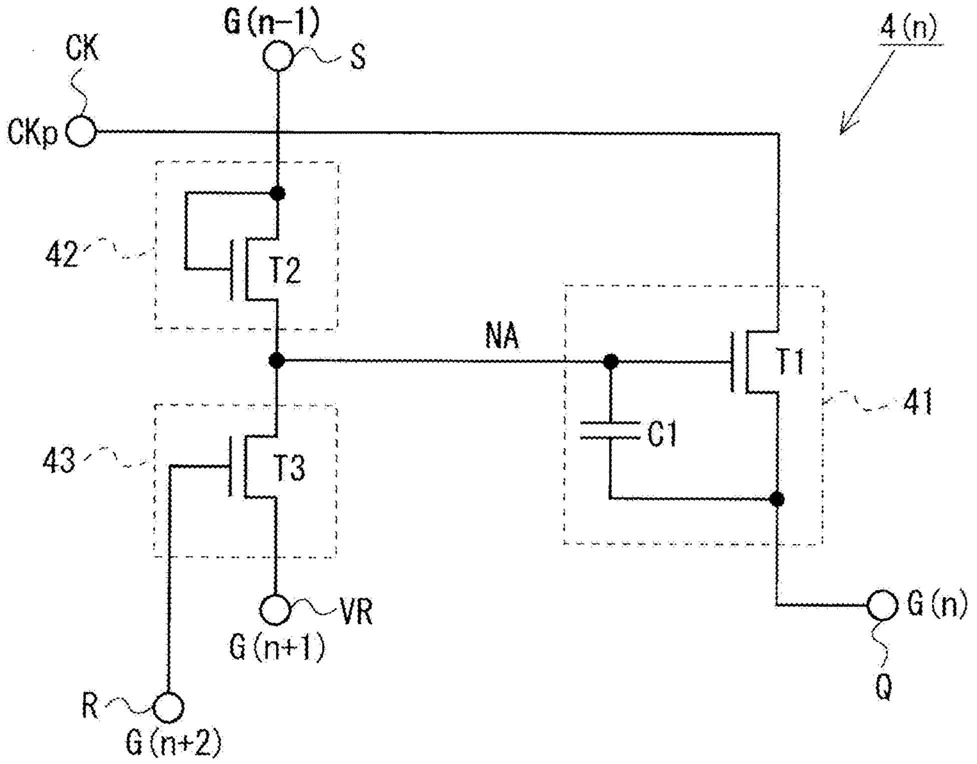
FIG. 13 is a circuit diagram illustrating a configuration of a unit circuit of the scanning signal line drive circuit in the second embodiment.

FIG. 13 is a circuit diagram illustrating a configuration example of the nth stage unit circuit 4(*n*) in the present embodiment ($1 \le n \le N$). The unit circuit 4(*n*) has the same configuration as the unit circuit 4(*n*) in the first embodiment described above (see FIG. 5), signals supplied to the reset input terminal R and the reset state voltage terminal VR are also the same as those of the unit circuit 4(*n*) in the first embodiment, and the input clock signal CKp supplied to the clock input terminal CK is also the same as that of the unit circuit 4(*n*) in the first embodiment except that the input clock signal CKp is one of the first to third clock signals constituting the three-phase clock signal. However, as illustrated in FIG. 13, the scanning signal G(n−1) which is the output signal of the unit circuit 4(*n*−1) of the preceding stage (first preceding stage) is supplied to the set input terminal S, and in this respect, the present embodiment is different from the first embodiment in that the scanning signal G(n−2) which is the output signal of the unit circuit 4(*n*−2) of the second preceding stage is supplied to the set input terminal S (see FIG. 5). Note that accordingly, as illustrated in FIG. 11, the start pulse signal SP is supplied to the set input terminal S of the first stage unit circuit 4(1) of the shift register 402 constituting the scanning signal line drive circuit 400 (see FIG. 12), and the scanning signal G(1) output from the first stage unit circuit 4(1) is supplied to the set input terminal S of the second stage unit circuit 4(2). However, hereinafter, for convenience of explanation, even when n=1, in the unit circuit 4(*n*), the output terminal Q of the unit circuit 4(*n*−1) of the first preceding stage is connected to the set input terminal S, and the scanning signal G(n−1), which is the stage output signal Q of the unit circuit 4(*n*−1) of the first preceding stage, is supplied to the set input terminal S.

Figure 14:
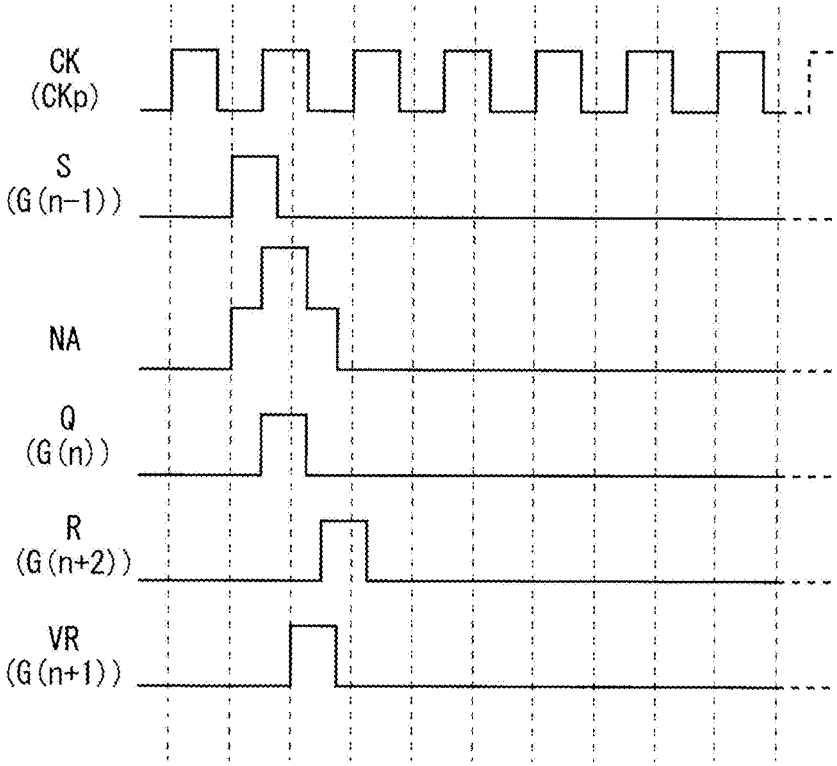
FIG. 14 is a signal waveform diagram for describing operations of the unit circuit in FIG. 13 in the second embodiment.

FIG. 14 is a signal waveform diagram for describing operations of the unit circuit 4(*n*) in the present embodiment illustrated in FIG. 13. As illustrated in FIG. 14, in the unit circuit 4(*n*), the scanning signal G(n−1) as the set signal S, the voltage of the internal node NA, the scanning signal G(n) as the stage output signal Q, the scanning signal G(n+2) as the reset signal R, and the scanning signal G(n+1) as the reset state voltage signal VR change substantially in the same manner as in the first embodiment (see FIG. 6)

although there is a slight difference in timing compared with those in the first embodiment due to the difference in the duty ratio of the input clock signal CKp and the set signal S.

Therefore, also in the present embodiment, the gate-source voltage Vgs and the drain-source voltage Vds in the reset transistor T3 change as illustrated in FIG. 10, similarly to the first embodiment. That is, the drain-source voltage Vds has a small value at the time when the gate-source voltage Vgs has a value near the threshold voltage Vth of the reset transistor T3 in the process in which the reset transistor T3 changes from an off state to an on state. Thus, the hot carrier degradation of the reset transistor T3 is suppressed or reduced and effects similar to the effects of the first embodiment can also be obtained with the present embodiment.

3. Third Embodiment

Next, a display device according to a third embodiment will be described. The display device according to the present embodiment is also an active matrix liquid crystal display device, and the overall configuration is as illustrated in FIG. 1 as in the first embodiment, and the electrical configuration of each pixel forming section Ps(i, j) is also as illustrated in FIG. 2 as in the first embodiment. Also, in the present embodiment, the scanning signal line drive circuit is a monolithic driver (GDM circuit). The scanning signal line drive circuit in the present embodiment will be described below and detailed description of other parts will be omitted. Note that in the configurations of the display device according to the present embodiment, portions that are the same as or corresponding to those of the above-described first embodiment are assigned the same reference signs.

The four-phase clock signal is used in the scanning signal line drive circuit in the first embodiment, the three-phase clock signal is used in the scanning signal line drive circuit in the second embodiment, so that the number of phases of the clock signals is specified by a specific numerical value. In contrast, in the scanning signal line drive circuit in the present embodiment, the number of phases of the clock signals is specified in a generalized form. That is, in the scanning signal line drive circuit in the present embodiment, the number of phases of the clock signal to be used is represented by a variable "k".

As the shift register constituting the scanning signal line drive circuit 400 in the present embodiment, a shift register (hereinafter, referred to as a "shift register of a first example") having a configuration basically similar to that of the shift register 401 in the first embodiment (see FIGS. 3 and 5) and a shift register (hereinafter, referred to as a "shift register of a second example") having a configuration basically similar to that of the shift register 402 in the second embodiment (see FIGS. 11 and 13) are considered. Both the shift register of the first example and the shift register of the second example operate by a k-phase clock signal including first to k-th clock signals CK1 to CKk, and in the shift registers, the first to k-th clock signals CK1 to CKk cyclically correspond to the unit circuits 4(1), 4(2), 4(3), 4(4), . . . , and a corresponding clock signal among the first to k-th clock signals CK1 to CKk is input to each unit circuit 4(*i*). However, in the shift register of the first example, similarly to the shift register 401 in the first embodiment, the scanning signal G(n−2) output from the unit circuit 4(*n*−2) of the second preceding stage is supplied to the set input terminal S of each unit circuit 4(*n*) of the nth stage (see FIG. 5), whereas in the shift register of the second example, similarly to the shift register 402 in the second embodiment, the scanning signal G(n−1) output from the unit circuit 4(*n*−1) of the first preceding stage is supplied to the set input terminal S of each unit circuit 4(*n*) of the nth stage, thus, in this respect, the shift register of the first example and the shift register of the second example differ from each other. Hereinafter, assuming that the duty ratio of the k-phase clock signal used in the present embodiment is D, conditions for the unit circuit 4(*n*) included in the shift register of the first example to operate substantially in the same manner as the unit circuit 4(*n*) included in the shift register 401 in the first embodiment and conditions for the unit circuit 4(*n*) included in the shift register of the second example to operate substantially in the same manner as the unit circuit 4(*n*) included in the shift register 402 in the second embodiment will be discussed.

3.1 Case of Using Shift Register of First Example

The configuration of the nth stage unit circuit 4(*n*) in the shift register of the first example is the same as that in the first embodiment, and the signals supplied to the set input terminal S, the reset input terminal R, and the reset state voltage terminal VR in the unit circuit 4(*n*) are also the same as those in the first embodiment (see FIG. 5).

Assuming that the nth stage unit circuit 4(*n*) in the shift register of the first example using the k-phase clock signal is configured as illustrated in FIG. 5 as in the first embodiment, the pulse of the input clock signal CKp is output as the pulse of the scanning signal G(n), which is the stage output signal Q, when the output transistor T1 is in an on state in the unit circuit 4(*n*). Therefore, as in the first embodiment, as illustrated in FIG. 6, in order for the pulse of the scanning signal G(n+1) supplied to the source terminal of the reset transistor T3 as the reset state voltage signal VR to partially overlap the pulse of the scanning signal G(n+2) supplied to the gate terminal of the reset transistor T3 as the reset signal R, it is necessary to cause the pulses to partially overlap between two adjacent clock signals CKq and CKq+1 among the first to k-th clock signals CK1 to CKk (q is an integer of $1 \le q \le 3$, where, when q=3, CKq+1 is replaced with CK1). For this purpose, as can be seen from the waveforms of the clock signals CK1 and CK2 illustrated in FIG. 15, the number k of phases and the duty ratio D need to satisfy the following expression. Note that in FIG. 15, the first clock signal CK1 is the input clock signal CKp, and the cycle of the k-phase clock signal is set to Tck=1.

$$1/k < D \tag{1}$$

Figure 15:
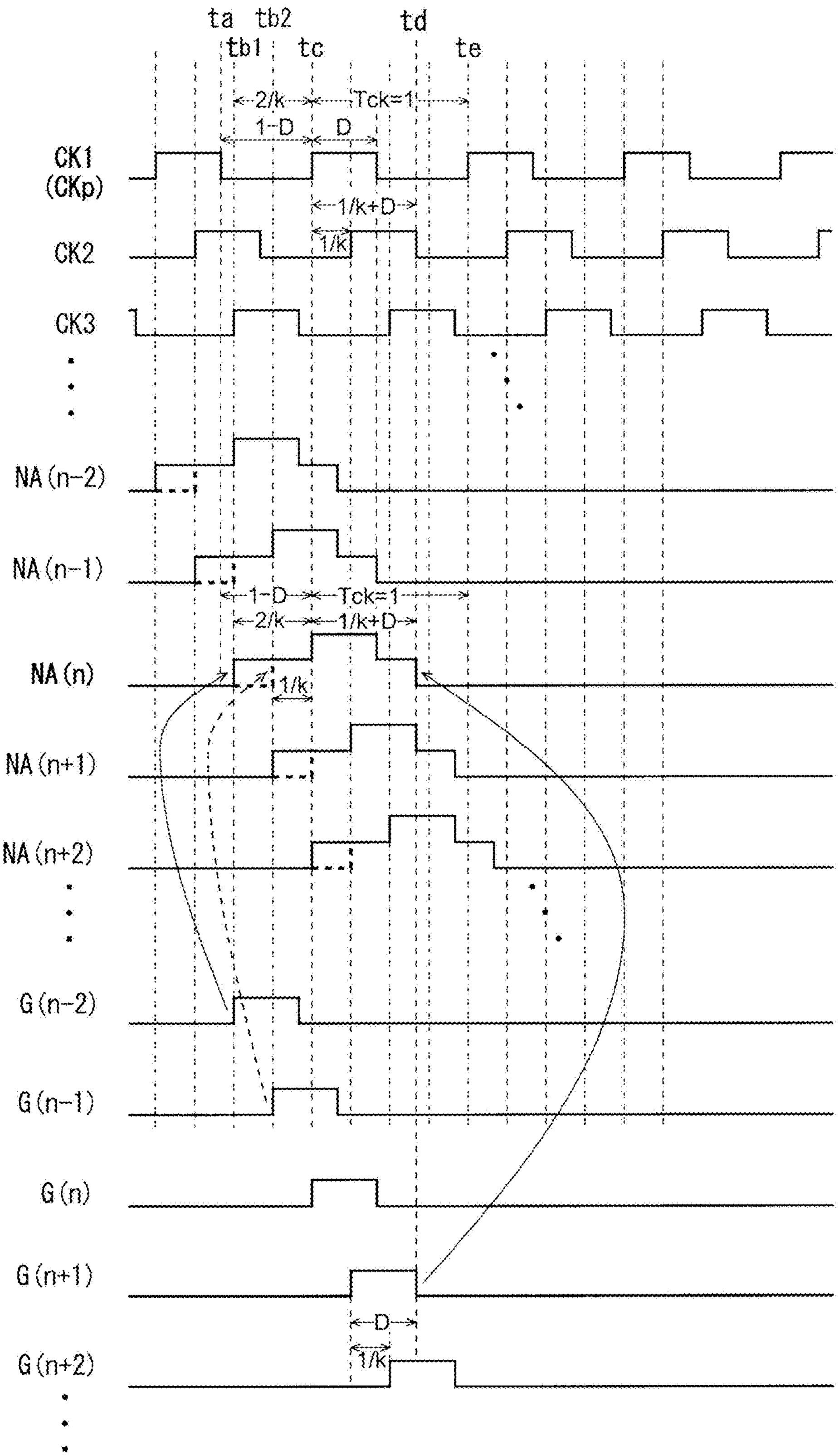
FIG. 15 is a signal waveform diagram for describing a condition to be satisfied by a k-phase clock signal used in the scanning signal line drive circuit in a third embodiment.

As can be seen from the voltage waveform of the internal node NA(n) of the unit circuit 4(*n*) illustrated in FIG. 15, the unit circuit 4(*n*) changes from a reset state to a set state at a rise time point tb1 of the scanning signal G(n−2) supplied to the set input terminal S thereof from the unit circuit 4(*n*−2) of the second preceding stage, and changes from the set state to the reset state at a fall time point td of the scanning signal G(n+1) supplied to the reset state voltage terminal VR thereof from the unit circuit 4(*n*+1) of the next stage (first subsequent stage). Therefore, the unit circuit 4(*n*) is in the set state (the voltage of the internal node NA is maintained at the first logic level) from the time tb1 to the time td, and only one pulse among the pulses of the input clock signal CKp=CK1 needs to be output as the pulse of the scanning signal G(n) from the output terminal Q via the output transistor T1 during the period tb1 to td of the set state. For this reason, it is necessary that the period tb1 to td of the set state does not overlap any of the pulses immediately before and immediately after the one pulse in the input clock signal CKp=CK1.

In the example illustrated in FIG. 15, among the pulses of the input clock signal CKp=CK1, the pulse rising at a time tc corresponds to the one pulse, and the pulse falling at a time ta corresponds to the immediately preceding pulse. Therefore, in order to prevent the period tb1 to td of the set state of the unit circuit 4(*n*) from overlapping the immediately preceding pulse, the following expression needs to be satisfied (see the waveform of the input clock signal CKp=CK1 and the waveform of the voltage of the internal node NA(n) illustrated in FIG. 15).

$$1 - D \geq 2/k \tag{2}$$

In addition, among the pulses of the input clock signal CKp=CK1, the pulse rising at a time the corresponds to the immediately following pulse. Therefore, in order to prevent the period tb1 to td of the set state of the unit circuit 4(*n*) from overlapping the immediately following pulse, the following equation needs to be satisfied (see the waveforms of the input clock signal CKp=CK1 and the voltage of the internal node NA(n) illustrated in FIG. 15).

$$1/k + D \leq Tck = 1 \tag{3}$$

When the above expression (2) is rewritten $D \leq 1-2/k$, and when the above equation (3) is rewritten $D \leq 1-1/k$. Therefore, since $1-2/k<1-1/k$ is obtained, when the following inequality is satisfied, only the pulse rising at the time tc among the pulses of the input clock signal CKp=CK1 is included in the period tb1 to td of the set state of the unit circuit 4(*n*), and none of the pulses immediately before and immediately after the pulse is included.

$$D \leq 1 - 2/k \tag{4}$$

In order for the shift register of the first example to operate in the same manner as the shift register 401 in the first embodiment, it is necessary to satisfy the following equation from the expressions (1) and (4).

$$1/k < D \leq 1 - 2/k \tag{5}$$

When k=1, 2, 3, there is no duty ratio ($0<D<1$) that satisfies the above expression (5), but when k is an integer equal to or greater than 4, there is a duty ratio that satisfies the above expression (5).

As described above, when k is an integer equal to or greater than 4 (when the number of phases of the clock signal is equal to or greater than 4), the shift register of the first example operates in the same manner as the shift register 401 in the first embodiment by using the k-phase clock signal having the duty ratio satisfying the above expression (5). Therefore, in the unit circuit 4(*n*) included in the shift register of the first example, the gate-source voltage Vgs and the drain-source voltage Vds in the reset transistor T3 change as illustrated in FIG. 10 in the process in which the reset transistor T3 changes from an off state to the on state. As a result, also in the present embodiment using the shift register of the first example, the hot carrier degradation of the reset transistor T3 is suppressed or reduced, and the same effect as that of the first embodiment is obtained.

Note that from the viewpoint of stability of the operation as the shift register, it is preferable to determine the number k of phases and the duty ratio of the clock signal so as to satisfy the following inequality instead of the above expression (5).

$$1/k < D < 1 - 2/k \tag{6}$$

3.2 Case of Using Shift Register of Second Example

The configuration of the nth stage unit circuit 4(*n*) in the shift register of the second example is the same as that in the second embodiment, and signals supplied to the set input terminal S, the reset input terminal R, and the reset state voltage terminal VR in the unit circuit 4(*n*) are also the same as those in the second embodiment (see FIG. 13).

Assuming that the nth stage unit circuit 4(*n*) in the shift register of the second example using the k-phase clock signal is configured as illustrated in FIG. 13 as in the second embodiment, the pulse of the input clock signal CKp is output as the pulse of the scanning signal G(n), which is the stage output signal Q, when the output transistor T1 is in the on state in the unit circuit 4(*n*). Therefore, as in the second embodiment, as illustrated in FIG. 14, in order for the pulse of the scanning signal G(n+1) supplied to the source terminal of the reset transistor T3 as the reset state voltage signal VR to partially overlap the pulse of the scanning signal G(n+2) supplied to the gate terminal of the reset transistor T3 as the reset signal R, it is necessary to cause the pulses to partially overlap between two adjacent clock signals CKq and CKq+1 among the first to k-th clock signals CK1 to CKk (q is an integer of $1 \leq q \leq 3$, where, when q=3, CKq+1 is replaced with CK1). For this purpose, as in the shift register of the first example, the number k of phases and the duty ratio D need to satisfy the following expression (see FIG. 15).

$$1/k < D \tag{7}$$

Unlike the shift register of the first example, the unit circuit 4(*n*) changes from the reset state to the set state at a rise time point tb2 of the scanning signal G(n−1) supplied to the set input terminal S thereof from the unit circuit 4(*n*−1) of the first preceding stage (see the waveform of the thick dotted line for the voltage of the internal node NA(n) illustrated in FIG. 15) and changes from the set state to the reset state at the fall time point td of the scanning signal G(n+1) supplied to the reset state voltage terminal VR thereof from the unit circuit 4(*n*+1) of the first subsequent stage. Therefore, the unit circuit 4(*n*) is in the set state (the voltage of the internal node NA is maintained at the first logic level) from the time tb2 to the time td, and only one pulse among the pulses of the input clock signal CKp=CK1 needs to be output as the pulse of the scanning signal G(n) from the output terminal Q via the output transistor T1 during the period tb2 to td of the set state. For this reason, it is necessary that the period tb2 to td of the set state does not overlap any of the pulses immediately before and immediately after the one pulse in the input clock signal CKp=CK1.

In the example illustrated in FIG. 15, among the pulses of the input clock signal CKp=CK1, the pulse rising at the time tc corresponds to the one pulse, and therefore, as can be seen from the waveform of the input clock signal CKp=CK1 and the waveform of the voltage of the internal node NA(n) (the waveform indicated by the thick dotted line) illustrated in FIG. 15, in order to prevent the period tb2 to td of the set state of the unit circuit 4(*n*) from overlapping the immediately preceding pulse, the following expression needs to be satisfied.

$$1 - D \geq 1/k \tag{8}$$

In addition, in order to prevent the period tb2 to td of the set state of the unit circuit 4(*n*) from overlapping the pulse immediately after the one pulse in the input clock signal CKp=CK1, the following equation needs to be satisfied (see the waveform of the input clock signal CKp=CK1 and the voltage waveform of the internal node NA(n) illustrated in FIG. 15).

$$1/k + D \leq Tck = 1 \tag{9}$$

needs to be satisfied. When the above expression (8) and equation (9) are rewritten, D≤1−1/k is obtained in both cases. Therefore, when the following inequality is satisfied, only one pulse of the input clock signal CKp=CK1 is included in the period tb2 to td of the set state of the unit circuit 4(*n*).

$$D \leq 1 - 1/k \tag{10}$$

In order for the shift register of the second example to operate in the same manner as the shift register 402 in the second embodiment, it is necessary to satisfy the following expression from the expressions (7) and (10).

$$1/k < D \leq 1 - 1/k \tag{11}$$

When k=1 or 2, there is no duty ratio (0<D<1) that satisfies the above expression (11), but when k is an integer equal to or greater than 3, there is a duty ratio that satisfies the above expression (11).

As described above, when k is an integer equal to or greater than 3 (when the number of phases of the clock signal is equal to or greater than 3), the shift register of the second example operates basically in the same manner as the shift register 402 in the second embodiment by using the k-phase clock signal having the duty ratio D satisfying the above expression (11). Therefore, in the unit circuit 4(*n*) included in the shift register of the second example, the gate-source voltage Vgs and the drain-source voltage Vds in the reset transistor T3 change as illustrated in FIG. 10 in the process in which the reset transistor T3 changes from the off state to the on state. As a result, also in the present embodiment using the shift register of the second example, the hot carrier degradation of the reset transistor T3 is suppressed or reduced, and the same effect as that of the second embodiment is obtained.

Note that from the viewpoint of stability of the operation as the shift register, it is preferable to determine the number k of phases and the duty ratio of the clock signal so as to satisfy the following inequality instead of the above expression (11).

$$1/k < D < 1 - 1/k \tag{12}$$

4. Modified Example

The disclosure is not limited to the above-described embodiment, and various modifications may be made without departing from the scope of the disclosure.

In each of the above-described embodiments, in order to suppress hot carrier degradation of the reset transistor T3 included in the unit circuit 4(*n*) in the scanning signal line drive circuit 400, the drain-source voltage Vds does not have a large value at the time when the gate-source voltage Vgs has a value near the threshold voltage Vth of the reset transistor T3 in the process in which the reset transistor T3 changes from the off state to the on state (see FIG. 10). For example, in the first and second embodiments, for this purpose, the scanning signal line drive circuit 400 is configured such that, in the unit circuit 4(*n*), the scanning signal G(n+2) is supplied to the gate terminal of the reset transistor T3 as the reset signal R from the unit circuit 4(*n*+2) of the second subsequent stage, and the scanning signal G(n+1) is supplied to the source terminal of the reset transistor T3 as the reset state voltage signal VR from the unit circuit 4(*n*+1) of the first subsequent stage (FIGS. 5 and 13). However, the reset signal R and the reset state voltage signal VR to be supplied to the gate terminal and the source terminal of the reset transistor T3, respectively, are not limited to the scanning signals G(n+2) and G(n+1). That is, the reset signal R and the reset state voltage signal VR may be selected so that the reset state voltage signal VR to be supplied to the source terminal of the reset transistor T3 maintains the H level when the reset signal R to be supplied to the gate terminal of the reset transistor T3 changes from the L level to the H level, and the reset state voltage signal VR changes from the H level to the L level (second logic level) before the reset signal R changes from the H level to the L level. More generally, the reset signal R and the reset state voltage signal VR may be selected so that the reset state voltage signal VR to be supplied to the source terminal of the reset transistor T3 maintains an active state when the reset signal R to be supplied to the gate terminal of the reset transistor T3 changes from an inactive state to the active state, and the reset state voltage signal VR changes from the active state to the inactive state before the reset signal R changes from the active state to the inactive state. Note that it is assumed that the voltage level indicating the active state of the reset state voltage signal VR is equal to the voltage level indicating the active state of the reset signal R, and the voltage level indicating the inactive state of the reset state voltage signal VR is equal to the voltage level (second logic level) indicating the reset state of the internal node NA.

In each of the above-described embodiments, each transistor such as the reset transistor T3 included in the unit circuit 4(*n*) is an N-channel transistor. However, instead of this, a P-channel transistor may be used. Even when the P-channel transistor is used, it is possible to achieve a shift register that operates substantially in the same manner as the shift register in each of the above embodiments by reversing the relationship of potentials in the circuit configuration in each of the above embodiments.

Although the liquid crystal display device has been described as an example in the embodiments, the disclosure is not limited thereto, and the disclosure is applicable to other types of the display devices such as an organic electroluminescence (EL) display device as long as the display device is an active matrix display device. In a case where the display device according to the above embodiments is the active matrix organic EL display device, the pixel forming section Ps(i, j) illustrated in FIG. 2 includes an organic EL element (also referred to as an organic light-emitting diode (OLED)), a holding capacitor, a TFT serving as the drive transistor, a TFT serving as the writing control switching element, and the like, instead of the TFT 10 serving as the pixel switching element, the liquid crystal capacitance Clc, and the like. In this case, the voltage of the data signal line DL(j), that is, the voltage of the data signal D(j), is written and held in the holding capacitor via the writing control switching element that is turned on/off by the scanning signal line GL(i), and the drive transistor supplies a current corresponding to a voltage held by the holding capacitor to the organic EL element. As a result, the organic EL element emits light with brightness corresponding to the voltage written in the holding capacitor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A scanning signal line drive circuit configured to drive a plurality of scanning signal lines arranged in a display portion of a display device, the scanning signal line drive circuit comprising:

a plurality of unit circuits connected in cascade to form a shift register, wherein the shift register operates based on a multi-phase clock signal, the multi-phase clock signal includes a plurality of clock signals cyclically corresponding to the plurality of unit circuits, a pulse of one of two clock signals adjacent to each other, among the plurality of clock signals partially overlaps a pulse of another one of the two clock signals, the plurality of unit circuits respectively corresponds to the plurality of scanning signal lines, each unit circuit is configured to determine a state of the unit circuit based on a set signal and a reset signal provided as input signals, and includes:

an internal node configured to selectively hold voltages of a first logic level and a second logic level indicating states of each unit circuit, a set circuit configured to apply a voltage of the first logic level to the internal node when the set signal is active, a reset circuit configured to apply a voltage of the second logic level to the internal node when the reset signal is active, an output circuit including an output transistor that is in an on state when the voltage of the first logic level is held in the internal node, and that is in an off state when the voltage of the second logic level is held in the internal node, a clock input terminal for receiving a corresponding clock signal among the plurality of clock signals, and an output terminal connected to a corresponding scanning signal line among the plurality of scanning signal lines and connected to the clock input terminal via the output transistor, the reset circuit includes a reset transistor including a drain terminal that is connected to the internal node, a source terminal, and a gate terminal to which the reset signal is supplied, the output circuit outputs a scanning signal, based on the corresponding clock signal, from the output terminal to the corresponding scanning signal line, and the shift register is configured, such that, in each unit circuit:

a voltage signal is supplied to the source terminal of the reset transistor as a reset state voltage signal, the voltage signal maintaining an active voltage level corresponding to an active state of the reset signal when the reset signal changes from an inactive state to the active state, and changing from the active voltage level to the second logic level before the reset signal changes from the active state to the inactive state, a scanning signal, output from a subsequent unit circuit in a stage subsequent to a current stage, is supplied to the source terminal of the reset transistor as the reset state voltage signal, and a scanning signal, output from a unit circuit subsequent to the subsequent unit circuit, is supplied to the gate terminal of the reset transistor as the reset signal.

2. The scanning signal line drive circuit according to claim 1, wherein a number k of phase of the multi-phase clock signal is an integer equal to, or greater than, 3, and a duty ratio D of the multi-phase clock signal satisfies the following inequality:

$$1/k < D \leq 1 - 1/k,$$

and the shift register is configured, such that, in each unit circuit;

a scanning signal, output from a unit circuit of one stage before the current stage, or a signal corresponding to the scanning signal is supplied to the set circuit as the set signal, a scanning signal, output from a unit circuit of one stage after the current stage, is supplied to the source terminal of the reset transistor as the reset state voltage signal, and a scanning signal, output from a unit circuit of two stages after the current stage, is supplied to the gate terminal of the reset transistor as the reset signal.

3. The scanning signal line drive circuit according to claim 1, wherein a number k of phases of the multi-phase clock signal is an integer equal to, or greater than, 4, and a duty ratio D satisfies the following inequality:

$$1/k < D \leq 1 - 2/k,$$

and the shift register is configured, such that, in each unit circuit;

a scanning signal, output from a unit circuit of two stages before the current stage, or a signal corresponding to the scanning signal is supplied to the set circuit as the set signal, a scanning signal, output from a unit circuit of one stage after the current stage, is supplied to the source terminal of the reset transistor as the reset state voltage signal, and a scanning signal, output from a unit circuit of two stages after the current stage, is supplied to the gate terminal of the reset transistor as the reset signal.

4. The scanning signal line drive circuit according to claim 1, wherein the shift register is configured, such that, in each unit circuit, a scanning signal, output from a unit circuit in a stage preceding the current stage, or a signal corresponding to the scanning signal is supplied to the set circuit as the set signal.

5. The scanning signal line drive circuit according to claim 1, wherein the set circuit includes a transistor having a diode connection configuration, including a drain terminal and a gate terminal that are supplied with the set signal, and including a source terminal connected to the internal node.

6. The scanning signal line drive circuit according to claim 1, wherein the reset transistor is a thin film transistor.

7. The scanning signal line drive circuit according to claim 6, wherein the thin film transistor includes a channel layer formed of an oxide semiconductor.

8. A display device comprising the scanning signal line drive circuit according to claim 1, wherein the scanning signal line drive circuit and the display portion are integrally formed on an identical substrate.

* * * * *